(12) United States Patent
Shima et al.

(10) Patent No.: US 7,506,159 B2
(45) Date of Patent: Mar. 17, 2009

(54) PRINTER AND PRINT SYSTEM

(75) Inventors: Toshihiro Shima, Nagano-ken (JP); Teruhito Kojima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 796 days.

(21) Appl. No.: 10/970,884

(22) Filed: Oct. 21, 2004

(65) Prior Publication Data

US 2005/0149755 A1 Jul. 7, 2005

(30) Foreign Application Priority Data

Oct. 23, 2003 (JP) .............................. 2003-363620
Oct. 23, 2003 (JP) .............................. 2003-363621

(51) Int. Cl.
*H04L 9/00* (2006.01)
(52) U.S. Cl. .......................... 713/161; 380/51; 380/258
(58) Field of Classification Search ................... 380/51, 380/258; 358/1.15; 702/150; 713/171, 194, 713/161, 71; 709/203; 235/380
See application file for complete search history.

(56) References Cited

U.S. PATENT DOCUMENTS

| 6,362,893 B1* | 3/2002 | Francis et al. .............. 358/1.14 |
|---|---|---|
| 6,681,214 B1* | 1/2004 | Doljack ........................ 705/75 |
| 6,772,945 B2* | 8/2004 | Mahoney et al. ............. 235/380 |
| 2002/0016921 A1* | 2/2002 | Olsen et al. .................. 713/200 |
| 2002/0161547 A1* | 10/2002 | Fidler .......................... 702/150 |
| 2003/0044009 A1* | 3/2003 | Dathathraya ................. 380/55 |
| 2003/0065923 A1* | 4/2003 | Parry .......................... 713/176 |
| 2003/0105963 A1* | 6/2003 | Slick et al. .................. 713/171 |
| 2003/0169443 A1* | 9/2003 | Ando ......................... 358/1.14 |

FOREIGN PATENT DOCUMENTS

JP 11-331144 11/1999

OTHER PUBLICATIONS

Abstract of Japanese Patent Publication No. JP 11-331144, Pub. Date: Nov. 30, 1999, Patent Abstracts of Japan.

* cited by examiner

*Primary Examiner*—Gilberto Barron, Jr.
*Assistant Examiner*—Hadi Armouche
(74) *Attorney, Agent, or Firm*—Martine Penilla & Gencarella, LLP

(57) ABSTRACT

A printer generates a public key dependent on printer position information and transmits it to a print client. The print client encrypts a common key with this public key and transmits it to the printer, and encrypts print data with this common key and transmits it to the printer. The printer generates a private key dependent on printer position information to decrypt the encrypted common key, and decrypts the print data with the common key. Consequently, the printer capable of restricting the place where a print operation can be executed can be provided.

15 Claims, 30 Drawing Sheets

TB10 : PUBLIC KEY STORAGE

| PUBLIC KEY |
|---|
| KEY10 |

TB20 : PUBLIC KEY TABLE

| PRINTER (D20) | PUBLIC KEY (D21) |
|---|---|
| 192.168.1.10 | KEY10 |
| 192.168.1.11 | KEY11 |
| ⋮ | ⋮ |

FIG. 9

TB30 : PRIVATE KEY STORAGE

PRIVATE KEY

KEY20

PRINTER AND PRINT SYSTEM

BACKGROUND OF THE INVENTION

1. Field of the Invention

The present invention relates to a printer and a print system, and particularly relates to a printer capable of restricting the place where print data can be printed and a print system including such a printer.

2. Description of the Related Art

These days, as a business model using a printer, a model, in which a printer manufacturer lends a printer to a user without charge and the user pays the printer manufacturer only usage fees proportional to the number of sheets the user printed with this printer, is attracting considerable attention. In such a business model, in addition to a charge proportional to the number of printed sheets, a charge proportional to the period of use, a charge proportional to the amount of ink used, and the like are conceivable.

There is a demand that when print data is transmitted from a print client such as a computer to a printer, the security of the print data be ensured by restricting the position of a printer capable of printing this print data. In response to such a demand, there is disclosed a technique for not only encrypting print data and transmitting it from a computer to a printer, but also restricting the position of a printer capable of decrypting this encrypted print data in Japanese Patent application Laid-open No. Hei 11-331144 (hereinafter referred to as Patent Document 1).

In a print system in this Patent Document 1, an encryption server manages an encryption key and a decryption key. When a computer which transmits data acquires the encryption key from the encryption server, the computer designates a position to which the decryption key may be transmitted and simultaneously encrypts the print data with the encryption key and transmits this encrypted print data to the printer. The printer which has received the encrypted print data transmits the position of the printer to the encryption server. The encryption server transmits the decryption key to the printer only when the position of the printer matches the position designated by the computer.

In the aforementioned business model in which the printer is lent without charge, if the user sells the printer borrowed from the printer manufacturer without permission or lends the printer to another person, the printer manufacturer cannot charge for the use of the printer. Therefore, the printer manufacturer wants to limit the place where the lent printer can be used, that is, the place where a proper print operation can be executed to a place of the user to whom the printer is lent.

In the print system in Patent Document 1, when the encrypted data is transmitted, only the position of the printer capable of decrypting the data can be designated, and therefore even in the case of a printer moved without permission, a print operation can be executed if the position of the printer is correctly designated.

SUMMARY OF THE INVENTION

Hence, the present invention is made in view of the aforementioned problem, and an object of the present invention is to provide a printer capable of executing a print operation only in a place registered in advance and a print system including such a printer.

In order to accomplish the aforementioned and other objects, according to one aspect of the present invention, a print system includes a printer which executes a print operation based on print data and a print client connected to the printer, wherein the printer comprises:

a first printer position information acquisition which acquires printer position information to specify a place where the printer is installed, this printer position information being regarded as first printer position information; and a public key generator which generates a public key with a passphrase containing at least the first printer position information;

the print client comprises:

a public key transmission request transmitter which transmits a public key transmission request to request public key transmission to the printer, the printer further comprises:

a public key transmission request receiver which receives the public key transmission request transmitted from the print client; and a public key transmitter which transmits the public key to the print client in response to the received public key transmission request, the print client further comprises:

a public key receiver which receives the public key transmitted from the printer;

a common key generator which generates a common key;

an encrypted common key generator which encrypts the common key with the public key to generate an encrypted common key;

an encrypted common key transmitter which transmits the encrypted common key to the printer;

a print data generator which generates print data;

an encrypted print data generator which encrypts the print data with the common key to generate encrypted print data; and an encrypted print data transmitter which transmits the encrypted print data to the printer, and the printer further comprises:

an encrypted common key receiver which receives the encrypted common key transmitted from the print client;

an encrypted print data receiver which receives the encrypted print data transmitted from the print client;

a second printer position information acquisition which acquires printer position information to specify a place where the printer is installed, this printer position information being regarded as second printer position information;

a private key generator which generates a private key with a passphrase containing at least the second printer position information;

a common key acquisition which decrypts the encrypted common key received by the encrypted common key receiver with the private key to acquire the common key; and a print data acquisition which decrypts the encrypted print data with the common key acquired by the common key acquisition to acquire the print data.

According to another aspect of the present invention, a control method of a print system including a printer which executes a print operation based on print data and a print client connected to the printer, comprises the steps of:

acquiring printer position information to specify a place where the printer is installed, this printer position information being regarded as first printer position information in the printer;

generating a public key with a passphrase containing at least the first printer position information in the printer;

transmitting a public key transmission request to request public key transmission from the print client to the printer;

receiving the public key transmission request transmitted from the print client in the printer;

transmitting the public key from the printer to the print client in response to the received public key transmission request;

receiving the public key transmitted from the printer in the print client;

generating a common key in the print client;

encrypting the common key with the public key to generate an encrypted common key in the print client;

transmitting the encrypted common key from the print client to the printer;

generating print data in the print client;

encrypting the print data with the common key to generate encrypted print data in the print client;

transmitting the encrypted print data from the print client to the printer;

receiving the encrypted common key transmitted from the print client in the printer;

receiving the encrypted print data transmitted from the print client in the printer;

acquiring printer position information to specify a place where the printer is installed in the printer, this printer position information being regarded as second printer position information;

generating a private key with a passphrase containing at least the second printer position information in the printer;

decrypting the received encrypted common key with the private key to acquire the common key in the printer; and decrypting the encrypted print data with the acquired common key to acquire the print data in the printer.

According to another aspect of the present invention, a printer which executes a print operation based on print data, comprises:

a first printer position information acquisition which acquires printer position information to specify a place where the printer is installed, this printer position information being regarded as first printer position information;

a public key generator which generates a public key with a passphrase containing at least the first printer position information;

a public key transmitter which transmits the public key to a print client in response to a request from the print client, an encrypted common key receiver which receives an encrypted common key generated by encrypting a common key with the public key from the print client;

an encrypted print data receiver which receives encrypted print data generated by encrypting print data with the common key from the print client;

a second printer position information acquisition which acquires printer position information to specify a place where the printer is installed, this printer position information being regarded as second printer position information;

a private key generator which generates a private key with a passphrase containing at least the second printer position information;

a common key acquisition which decrypts the encrypted common key received by the encrypted common key receiver with the private key to acquire the common key; and a print data acquisition which decrypts the encrypted print data with the common key acquired by the common key acquisition to acquire the print data.

According to another aspect of the present invention, a control method of a printer which executes a print operation based on print data, comprises the steps of:

acquiring printer position information to specify a place where the printer is installed, this printer position information being regarded as first printer position information;

generating a public key with a passphrase containing at least the first printer position information;

transmitting the public key to a print client in response to a request from the print client, receiving an encrypted common key generated by encrypting a common key with the public key from the print client;

receiving encrypted print data generated by encrypting print data with the common key from the print client;

acquiring printer position information to specify a place where the printer is installed, this printer position information being regarded as second printer position information;

generating a private key with a passphrase containing at least the second printer position information;

decrypting the received encrypted common key with the private key to acquire the common key; and decrypting the encrypted print data with the acquired common key to acquire the print data.

According to another aspect of the present invention, a data transmitting and receiving system includes a data receiving device which performs a predetermined process based on received data and a data transmitting device connected to the data receiving device, wherein the receiving device comprises:

a first data receiving device position information acquisition which acquires data receiving device position information to specify a place where the data receiving device is installed, this data receiving device position information being regarded as first data receiving device position information; and a public key generator which generates a public key with a passphrase containing at least the first data receiving device position information;

the data transmitting device comprises:

a public key transmission request transmitter which transmits a public key transmission request to request public key transmission to the data receiving device, the data receiving device further comprises:

a public key transmission request receiver which receives the public key transmission request transmitted from the data transmitting device; and a public key transmitter which transmits the public key to the data transmitting device in response to the received public key transmission request, the data transmitting device further comprises:

a public key receiver which receives the public key transmitted from the data receiving device;

a common key generator which generates a common key;

an encrypted common key generator which encrypts the common key with the public key to generate an encrypted common key;

an encrypted common key transmitter which transmits the encrypted common key to the data receiving device;

a data generator which generates data to perform a predetermined process;

an encrypted data generator which encrypts the data with the common key to generate encrypted data; and an encrypted data transmitter which transmits the encrypted data to the data receiving device, and the data receiving device further comprises:

an encrypted common key receiver which receives the encrypted common key transmitted from the data transmitting device;

an encrypted data receiver which receives the encrypted data transmitted from the data transmitting device;

a second data receiving device position information acquisition which acquires data receiving device position information to specify a place where the data receiving device is installed, this data receiving device position information being regarded as second data receiving device position information;

a private key generator which generates a private key with a passphrase containing at least the second data receiving device position information;

a common key acquisition which decrypts the encrypted common key received by the encrypted common key receiver with the private key to acquire the common key; and a data acquisition which decrypts the encrypted data with the common key acquired by the common key acquisition to acquire the data.

According to another aspect of the present invention, a control method of a data transmitting and receiving system including a data receiving device which performs a predetermined process based on received data and a data transmitting device connected to the data receiving device, comprises the steps of:

acquiring data receiving device position information to specify a place where the data receiving device is installed in the data receiving device, this data receiving device position information being regarded as first data receiving device position information;

generating a public key with a passphrase containing at least the first data receiving device position information in the data receiving device;

transmitting a public key transmission request to request public key transmission from the data transmitting device to the data receiving device;

receiving the public key transmission request transmitted from the data transmitting device in the data receiving device;

transmitting the public key to the data transmitting device in response to the received public key transmission request;

receiving the public key transmitted from the data receiving device in the data transmitting device;

generating a common key in the data transmitting device;

encrypting the common key with the public key to generate an encrypted common key;

transmitting the encrypted common key from the data transmitting device to the data receiving device;

generating data to perform a predetermined process in the data transmitting device;

encrypting the data with the common key to generate encrypted data in the data transmitting device;

transmitting the encrypted data from the data transmitting device to the data receiving device;

receiving the encrypted common key transmitted from the data transmitting device in the data receiving device;

receiving the encrypted data transmitted from the data transmitting device in the data receiving device;

acquiring data receiving device position information to specify a place where the data receiving device is installed in the data receiving device, this data receiving device position information being regarded as second data receiving device position information;

generating a private key with a passphrase containing at least the second data receiving device position information;

decrypting the received encrypted common key with the private key to acquire the common key; and decrypting the encrypted data with the acquired common key to acquire the data.

According to another aspect of the present invention, a data receiving device which performs a predetermined process based on data, comprises:

a first data receiving device position information acquisition which acquires data receiving device position information to specify a place where the data receiving device is installed, this data receiving device position information being regarded as first data receiving device position information;

a public key generator which generates a public key with a passphrase containing at least the first data receiving device position information;

a public key transmitter which transmits the public key to a data transmitting device in response to a request from the data transmitting device, an encrypted common key receiver which receives an encrypted common key generated by encrypting a common key with the public key from the data transmitting device;

an encrypted data receiver which receives encrypted data generated by encrypting data with the common key from the data transmitting device;

a second data receiving device position information acquisition which acquires data receiving device position information to specify a place where the data receiving device is installed, this data receiving device position information being regarded as second data receiving device position information;

a private key generator which generates a private key with a passphrase containing at least the second data receiving device position information;

a common key acquisition which decrypts the encrypted common key received by the encrypted common key receiver with the private key to acquire the common key; and a data acquisition which decrypts the encrypted data with the common key acquired by the common key acquisition to acquire the data.

According to another aspect of the present invention, a control method of a data receiving device which performs a predetermined process based on data, comprises the steps of:

acquiring data receiving device position information to specify a place where the data receiving device is installed, this data receiving device position information being regarded as first data receiving device position information;

generating a public key with a passphrase containing at least the first data receiving device position information;

transmitting the public key to a data transmitting device in response to a request from the data transmitting device, receiving an encrypted common key generated by encrypting a common key with the public key from the data transmitting device;

receiving encrypted data generated by encrypting data with the common key from the data transmitting device;

acquiring data receiving device position information to specify a place where the data receiving device is installed, this data receiving device position information being regarded as second data receiving device position information;

generating a private key with a passphrase containing at least the second data receiving device position information;

decrypting the received encrypted common key with the private key to acquire the common key; and decrypting the encrypted data with the acquired common key to acquire the data.

BRIEF DESCRIPTION OF THE DRAWINGS

FIG. 9 is a diagram showing an example of the structure of a public key table in the first embodiment;

DETAILED DESCRIPTION OF THE EMBODIMENTS

First Embodiment

Figure 1:
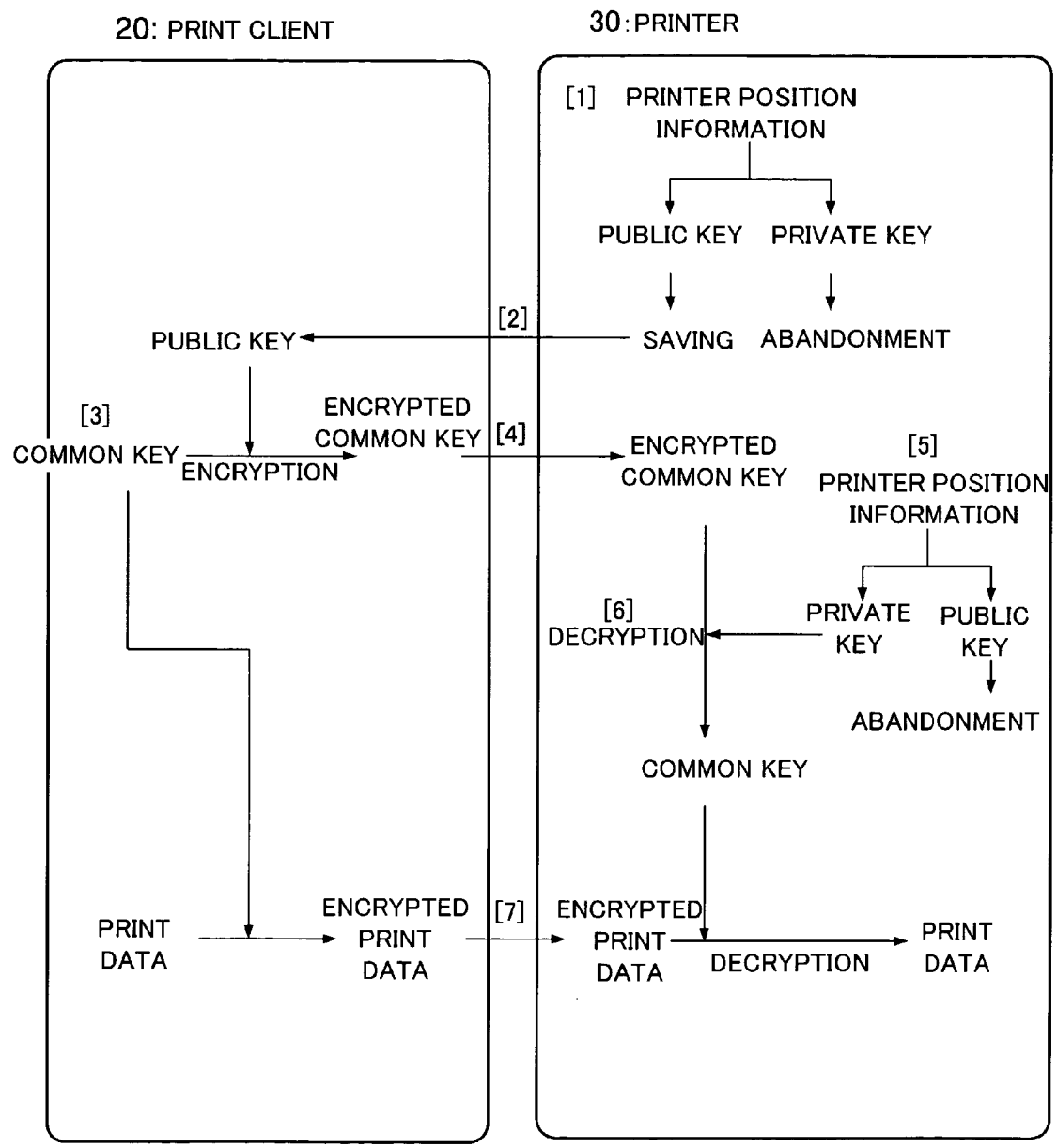
FIG. 1 is a diagram showing the uses of a common key, a public key, and a private key in a print system according to a first embodiment of the present invention.

First, a summary of a process of a print system according to the first embodiment of the present invention will be presented based on FIG. 1. As shown in FIG. 1, in this embodiment, when a printer 30 is installed, the printer 30 generates a public key and a private key with a passphrase containing at least printer position information indicating a position where the printer 30 is installed, and holds the public key but abandons the private key (step [1]).

When receiving a public key request from a print client 20 which wants to transmit print data, the printer 30 transmits the held public key to the print client 20 (step [2]). The print client 20 generates a common key using an appropriate random number or the like (step [3]), encrypts this common key with the acquired public key, and transmits it as an encrypted common key to the printer 30 (step [4]).

At a point in time when the printer 30 has received the encrypted common key, the printer 30 acquires printer position information at this point in time and generates a public key and a private key with a passphrase containing at least this printer position information (step [5]). Then, the printer 30 decrypts the received encrypted common key with the generated private key (step [6]). At this time, the public key is abandoned without being saved.

If the position of the printer 30 is not moved from a place where the public key was generated in step [1], the printer 30 can decrypt the encrypted common key, and acquire the common key. However, if the position of the printer 30 is moved from the place where the public key was generated in step [1], the printer 30 cannot decrypt the encrypted common key, and cannot acquire the common key.

The print client 20 encrypts the print data with the common key generated in step [3], and transmits it as encrypted print data to the printer 30 (step [7]). After all, this encrypted print data can be decrypted with the common key acquired in step [6] in the printer 30 which is not moved from the installation position, but cannot be decrypted in the printer 30 which is moved therefrom. Hence, the position where the printer 30 can be properly used can be limited to the position where the public key was generated in step [1].

As can be known from the above description, the timing when the public key is transmitted from the printer 30 to the print client 20 may be any timing from the installation of the printer 30 to the occurrence of a print request. However, the step [5] of generating the private key needs to be performed after the printer 30 has received the encrypted common key and/or after the printer 30 has received the encrypted print data.

Moreover, the encrypted common key and the encrypted print data may be transmitted from the print client 20 to the printer 30 in the order presented, or may be transmitted in reverse order, that is, in order of the encrypted print data and the encrypted common key. Alternatively, the encrypted common key and the encrypted print data may be transmitted simultaneously as one file.

Figure 2:
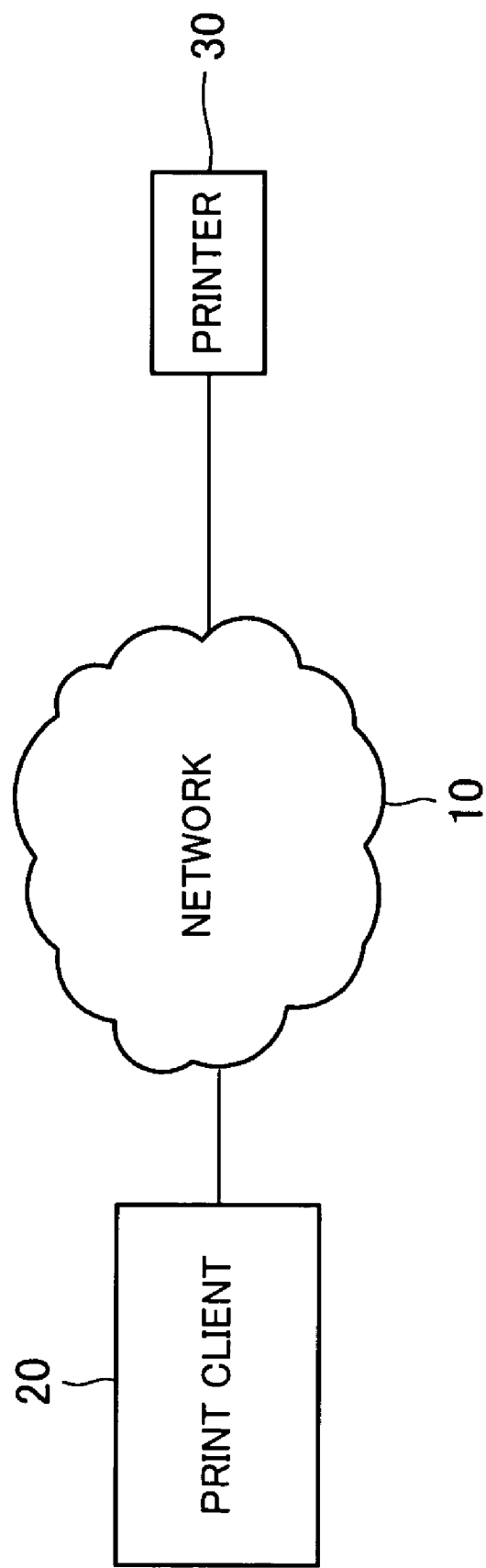
FIG. 2 is a block diagram showing the overall configuration of the print system according to the first embodiment.

Next, the configuration of the print system according to this embodiment will be explained based on FIG. 2. FIG. 2 is a block diagram showing the hardware configuration of the print system according to this embodiment.

As shown in FIG. 2, the print system according to this embodiment includes a print client 20 connected to a network 10 and a printer 30 also connected to the network 10. In this embodiment, the network 10 is constituted by the Internet using TCP/IP (transmission control protocol/internet protocol). However, the form of the network 10 is not limited to the Internet, and, for example, it may be constituted by a LAN such as Ethernet®.

The print client 20 is composed of any of various kinds of computers, for example, called a host computer and a personal computer. In this embodiment, in particular, the print client 20 generates encrypted print data by encrypting print data and transmits this encrypted print data to the printer 30 via the network 10. The number of print clients connected to the network 10 is optional, and it may be one or more than one. Moreover, the print client is not limited to a computer, and, for example, it may be a digital camera with a necessity to print a taken image, a content server in which print image data is stored as contents, or the like.

Further, in this embodiment, the printer 30 is a so-called network printer. In this embodiment, particularly, the printer 30 receives encrypted print data from the print client 20 and decrypts this encrypted print data with a common key and executes a print operation.

In this embodiment, the printer 30 is directly connected to the network 10, and the printer 30 has its own peculiar network address. Accordingly, the print client 20 can transmit the encrypted print data to the printer 30 by designating this network address.

Incidentally, the printer 30 is directly connected to the network 10 in FIG. 2, but may be connected thereto via a printer server. The number of printers connected to the network 10 is optional, and it may be one or more than one.

Figure 3:
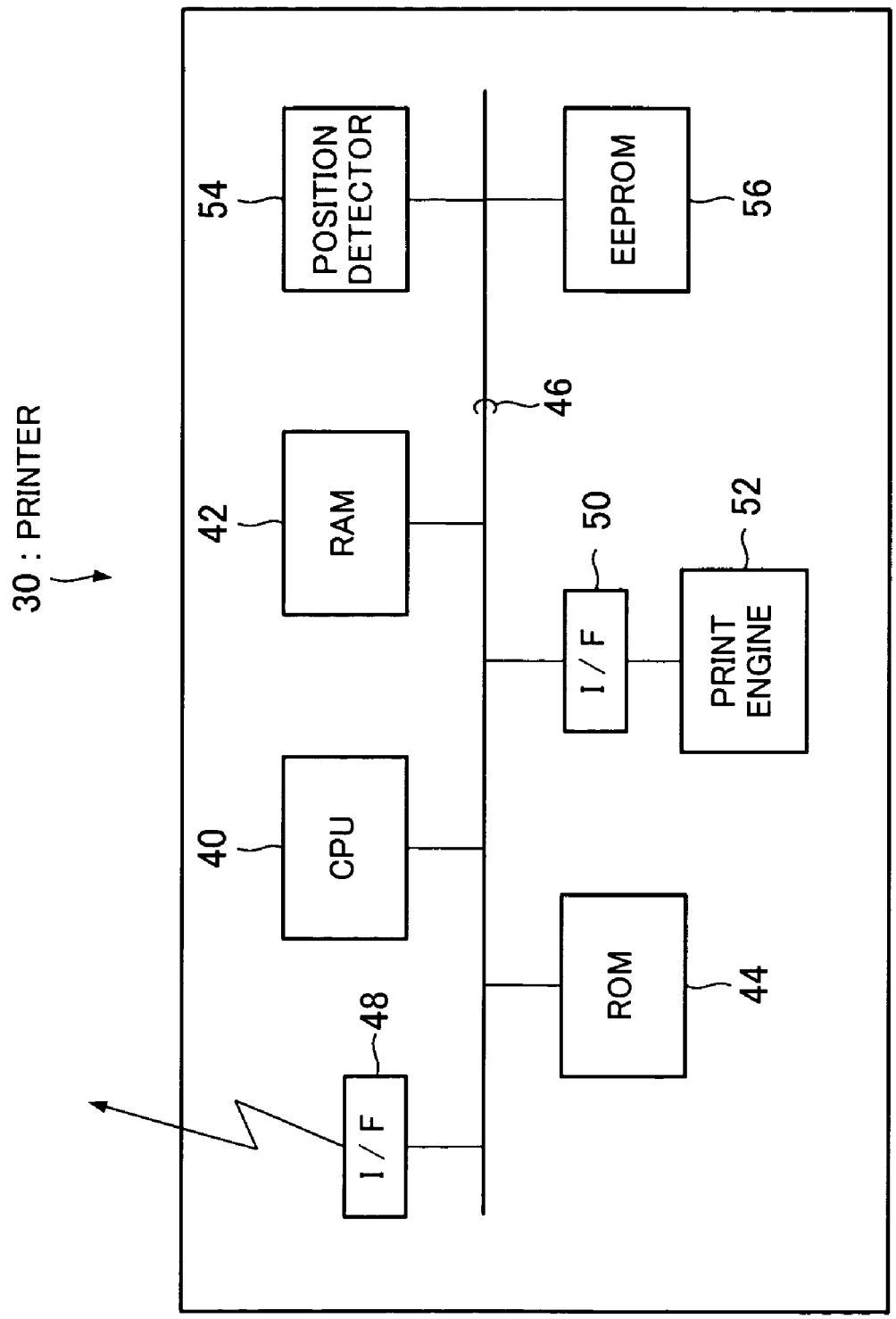
FIG. 3 is a block diagram showing the hardware configuration of the printer according to the first embodiment.

FIG. 3 is a block diagram for explaining the internal configuration of the printer 30. As shown in FIG. 3, the printer 30 includes a CPU (Central Processing Unit) 40, a RAM (Random Access Memory) 42, and a ROM (Read Only Memory) 44, and they are connected to each other via an internal bus 46. A communication interface 48 is connected to the internal bus 46, and the printer 30 is connected to the aforementioned network 10 via the communication interface 48. In addition, an interface 50 is connected to the internal bus 46, and a print engine 52 is connected to the interface 50.

Moreover, a position detector 54 is connected to the internal bus 46. This position detector 54 has a function of specifying a position where the printer 30 is installed. In this embodiment, the position detector 54 is constituted, for example, by a GPS (global positioning system), and the latitude, longitude, and altitude of the position where the printer 30 is installed can be specified. It is said that the accuracy of the GPS at the present time is approximately ±10 m in the latitude, the longitude, and the altitude, respectively.

However, the constitution of the position detector 54 is not limited to the constitution using the GPS, and, for example, when the printer 30 is connected to the network 10 by a wireless LAN, the position of the printer 30 may be specified based on a wireless base station which accommodates the printer 30. Alternatively, the position of the printer 30 may be specified by using mobile communication technology including the PHS (Personal Handyphone System).

Further, it is also possible that the position detector 54 includes both a GPS function and a PHS function and normally detects an installation position by the GPS, but when the position detector 54 cannot detect the position by the GPS due to radio wave conditions, it may detect the position by the PHS.

Furthermore, the printer 30 according to this embodiment includes an EEPROM (Electrically Erasable Programmable ROM) 56 connected to the internal bus 46 as a nonvolatile semiconductor memory device. Information stored in the EEPROM 56 is held even when the printer 30 is powered off.

Figure 4:
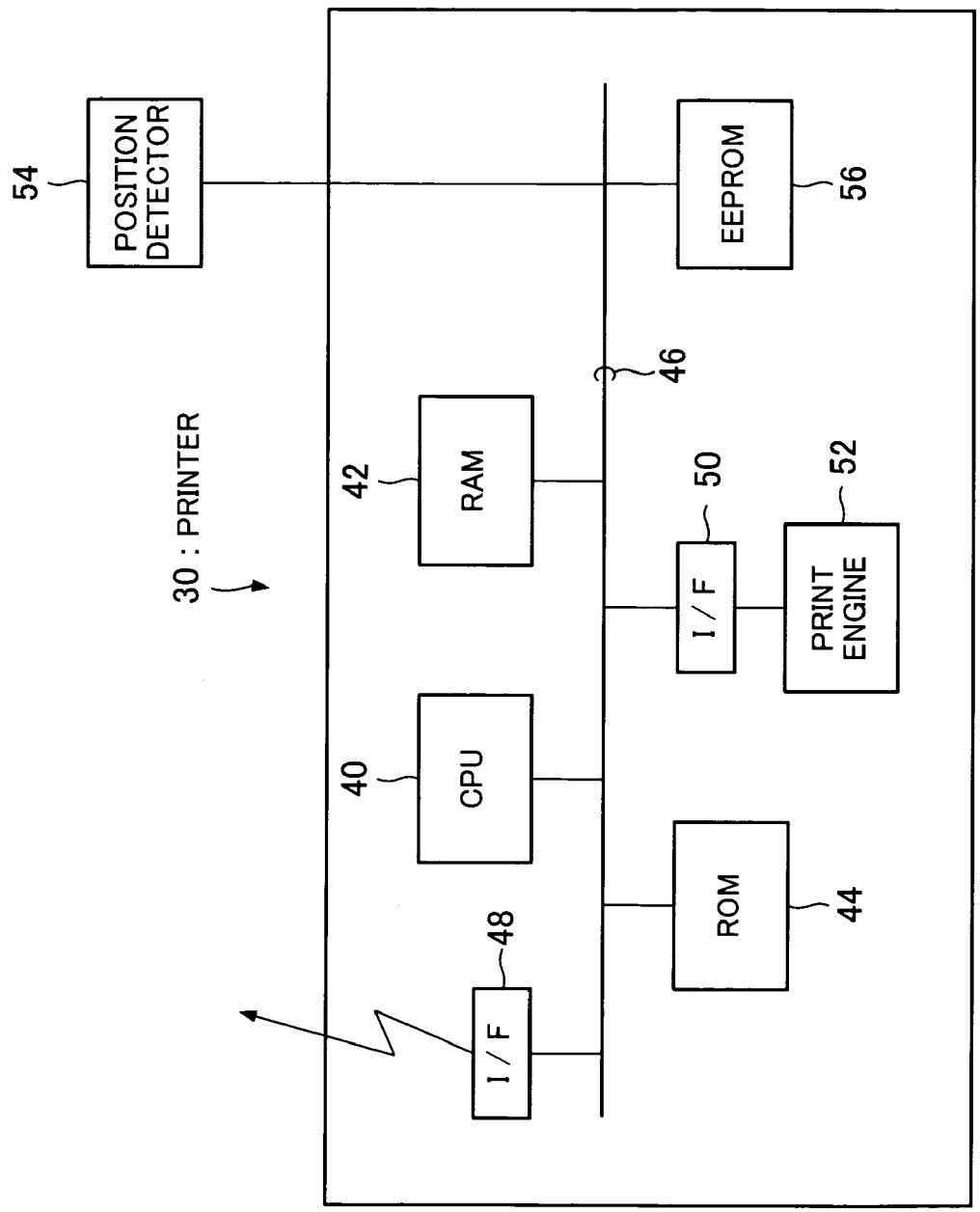
FIG. 4 is a block diagram showing a modification of the hardware configuration of the printer.

Additionally, although the position detector 54 is contained in the printer 30 in FIG. 3, the position detector 54 may be provided outside the printer 30 as shown in FIG. 4. For example, it is possible that when the necessity arises, a cellular phone equipped with the GPS is connected to the printer 30, and thereby the printer 30 has a position detection function.

Figure 5:
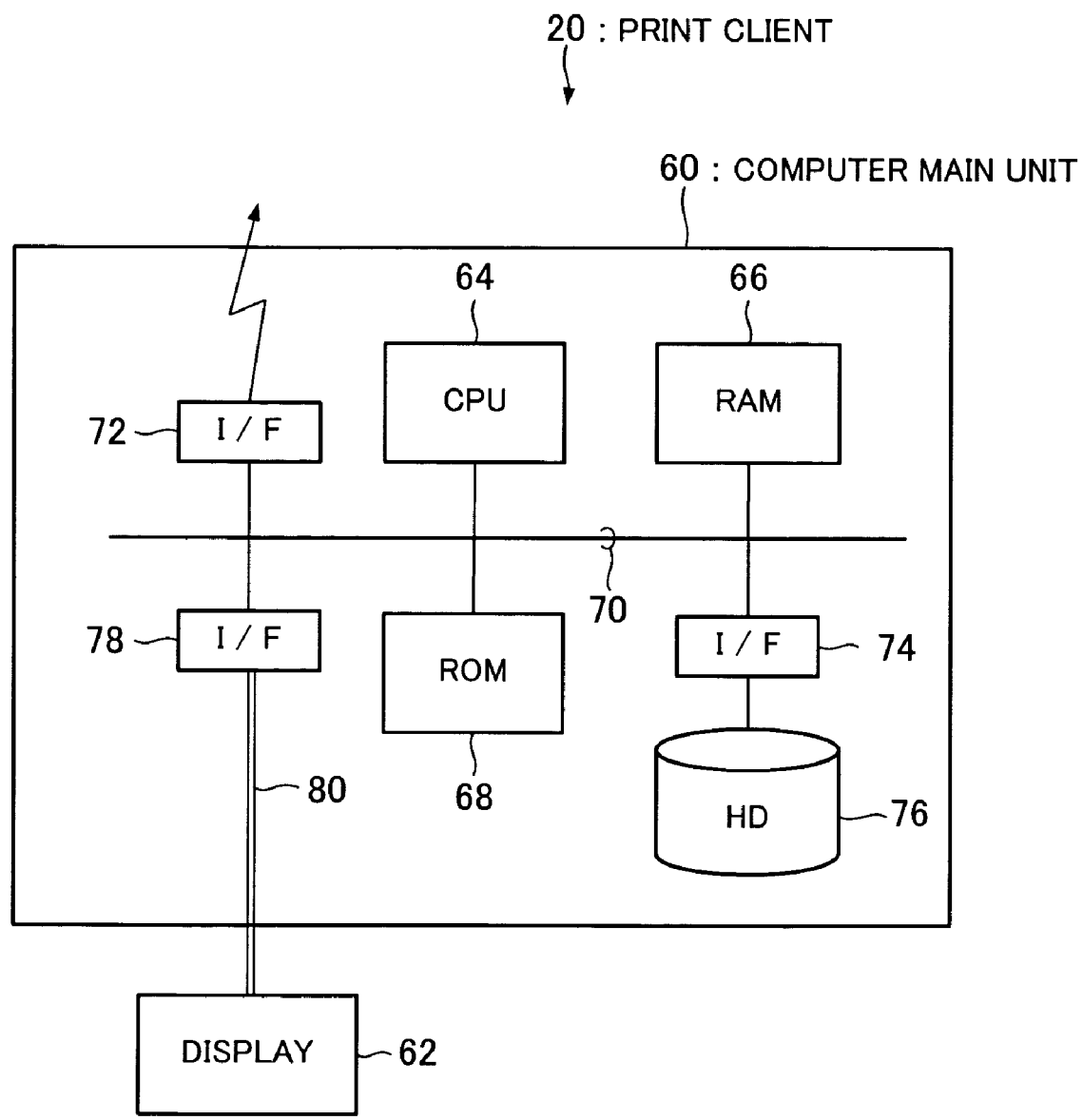
FIG. 5 is diagram showing the hardware configuration of a print client according to the first embodiment.

FIG. 5 is a block diagram for explaining the internal configuration of the print client 20. As shown in FIG. 5, the print client 20 according to this embodiment includes a computer main unit 60 and a display 62.

The computer main unit 60 includes a CPU 64, a RAM 66, and a ROM 68, and they are connected to each other via an internal bus 70. A communication interface 72 is connected to the internal bus 70, and the print client 20 is connected to the aforementioned network 10 via the communication interface 72.

Moreover, an interface 74 is connected to the internal bus 70, and a hard disk 76 which is a large capacity storage is connected to the interface 74. Further, an interface 78 is connected to the internal bus 70, and the aforementioned display 62 is connected via a cable 80 which extends from the interface 78.

Next, processes executed in the printer 30 and the print client 20 to realize the process explained by means of FIG. 1 will be explained in detail.

Figure 6:
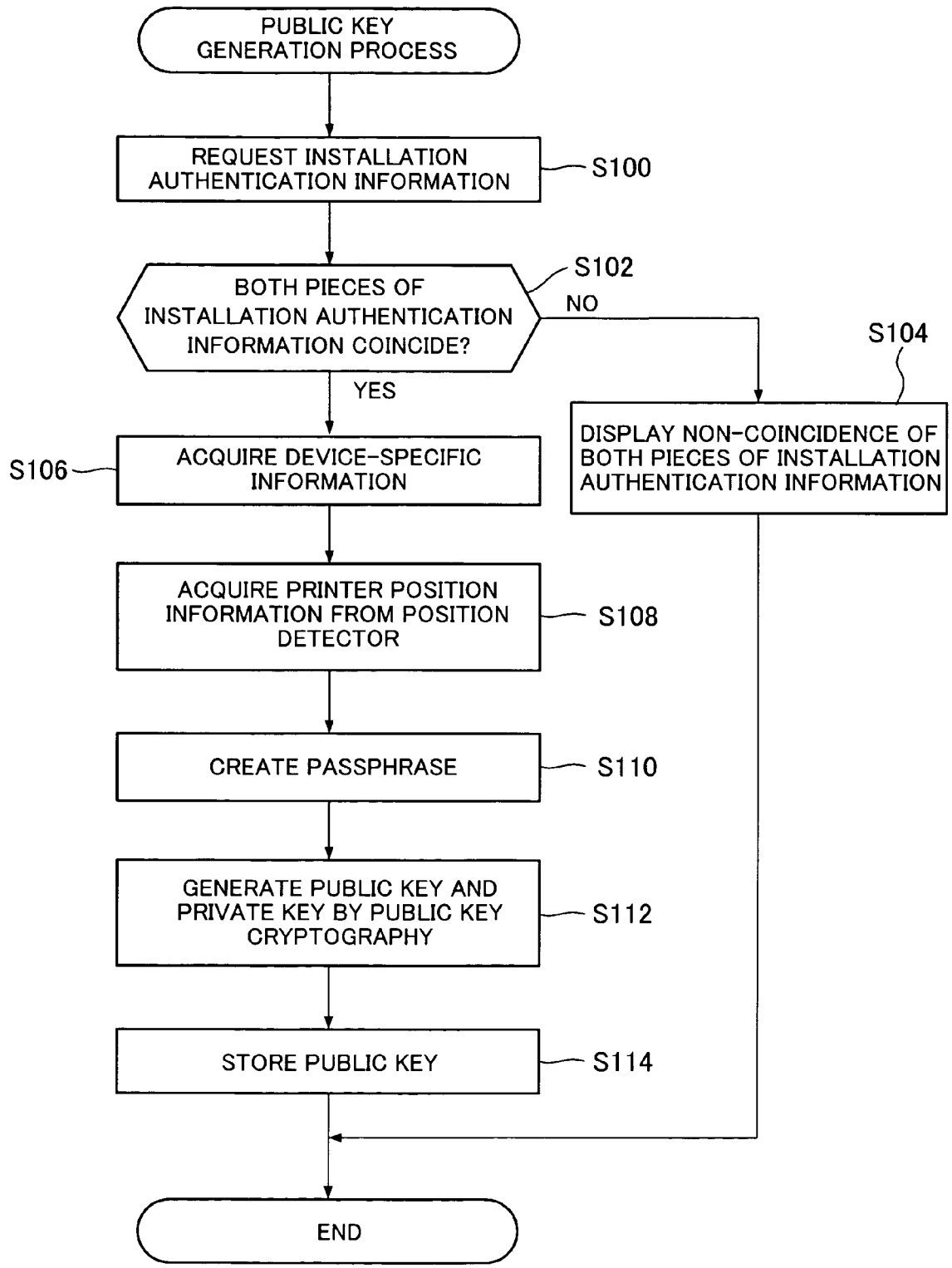
FIG. 6 is a flowchart explaining a public key generation process in the first embodiment.

First, a public key generation process executed in the printer 30 when the printer 30 is installed will be explained based on FIG. 6. FIG. 6 is a flowchart explaining the public key generation process executed in the printer 30. This public key generation process is realized by making the CPU 40 read and execute a public key generation program stored in the ROM 44 of the printer.

As shown in FIG. 6, first, the printer 30 requests an operator of the printer 30 to input installation authentication information (step S100). For example, the printer 30 displays an instruction to input installation authentication information on a display panel provided on this printer 30. The operator, for example, operates an operation panel provided on the printer 30 to input installation authentication information. For example, in this embodiment, the installation authentication information is composed of a combination of an ID and a password for installation authentication information. Hence, the operator inputs these ID and password for installation authentication information from the operation panel.

Then, the printer 30 judges whether the inputted installation authentication information coincides with installation authentication information previously registered with this printer 30 (step S102). More specifically, the printer 30 judges whether the ID and the password for installation authentication information inputted by the operator as described above coincide with an ID and a password for installation authentication information previously registered with the printer 30. In this embodiment, for example, when the printer 30 is shipped, these ID and password for installation authentication information are stored in the EEPROM 56, and only a manufacturer of this printer 30 can know these ID and password for installation authentication information.

When these two pieces of installation authentication information do not coincide (step S102: No), the printer 30 displays non-coincidence of the two pieces of installation authentication information on the display panel of the printer 30 (step S104), and completes this public key generation process.

On the other hand, when these two pieces of installation authentication information coincide (step S102: Yes), the printer 30 acquires device-specific information on the printer 30 (step S106). Here, the device-specific information is identification information specifically assigned to the printer 30, and it is, for example, a manufacturer's serial number, a MAC address, or the like of the printer 30.

Then, the printer 30 acquires printer position information on the printer 30 at this point in time from the position detector 54 (step S108). Subsequently, the printer 30 creates a passphrase with the device-specific information and the printer position information (step S110). There are various methods of creating the passphrase, and in this embodiment, the passphrase is created by simply joining the printer position information after the device-specific information. Incidentally, the passphrase may contain data other than these device-specific information and printer position information.

Thereafter, the printer 30 generates a public key and a private key with the created passphrase by a public key cryptography (step S112). The public key cryptography has the property that the same public key and private key are generated again if the same passphrase is used. Then, the printer 30 stores and holds only the public key out of the generated public key and private key (step S114). Incidentally, the private key is abandoned without being saved. Thus, the public key generation process according to this embodiment is completed.

Figure 7:
FIG. 7 is a diagram showing an example of the structure of a public key storage in the first embodiment.

FIG. 7 is a diagram showing an example of a public key storage TB10 in which the public key is stored in step S114. In this embodiment, this public key storage TB10 is formed in the EEPROM56. Therefore, the public key stored in the public key storage TB10 is held in a non-volatile manner even if the printer 30 is powered off.

Figure 8:
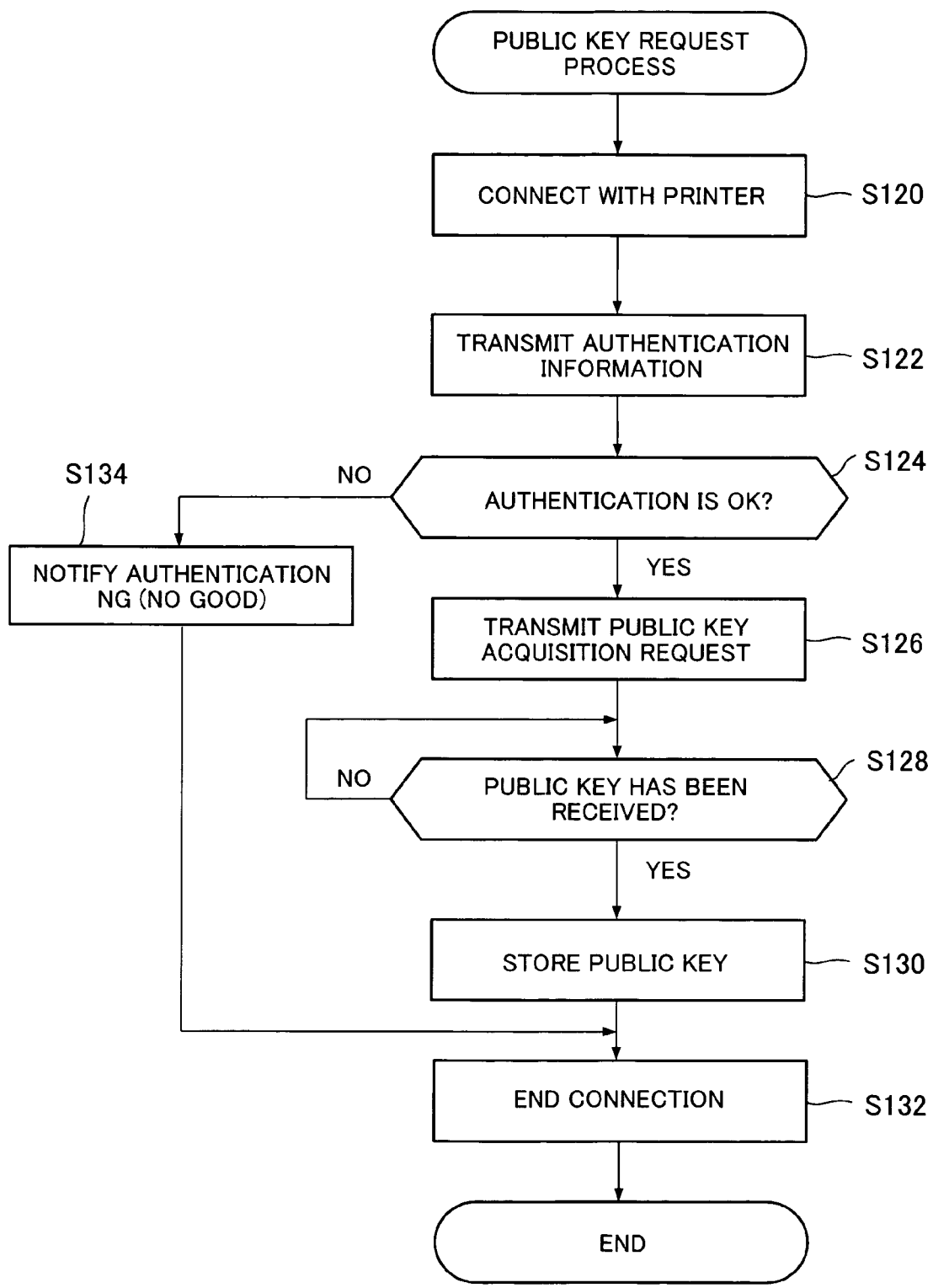
FIG. 8 is a flowchart explaining a public key request process in the first embodiment.

FIG. 8 is a flowchart explaining a public key request process executed in the print client 20. This public key request process is realized by making the CPU 64 read and execute a public key request program stored in the ROM 68 or the hard disk 76 of the print client. This public key request process is required to be started at any given timing from when the printer 30 is installed until print data is tried to be transmitted. For example, in this embodiment, when a user instructs the print client 20 to perform printing with the printer 30 after creating data to be printed and the print client 20 does not hold the public key of the printer 30 at this time, this public key request process is started.

As shown in FIG. 8, in this public key request process, the print client 20 first connects with the printer 30 (step S120). In this embodiment, the print client 20 establishes a connection between the print client 20 and the printer 30 by designating the network address of the printer 30.

Thereafter, the print client 20 transmits authentication information to the printer 30 (step S122). In this embodiment, a combination of a client ID to specify the print client and a password is used as the authentication information. Accordingly, the print client 20 transmits the client ID and the password to the printer 30.

Subsequently, the print client 20 receives an authentication result indicating whether authentication has been accepted from the printer 30, and judges whether the authentication has been accepted by the printer 30 based on the authentication result (step S124).

When the authentication has been accepted (step S124: Yes), the print client 20 transmits a public key acquisition request to the printer 30 (step S126). Then, the print client 20 judges whether a public key has been received from the printer 30 (step S128). When the public key has not been received from the printer 30 (step S128: No), the print client 20 stands by while repeating the process in step S128.

On the other hand, when the public key has been received from the printer 30 (step S128: Yes), this public key is stored (step S130). In this embodiment, the print client 20 is provided with a public key table TB20 on the hard disk 76, and the acquired public key is stored and held in this public key table TB20.

FIG. 9 is a diagram showing an example of the structure of the public key table TB20. As shown in FIG. 9, the public key table TB20 includes an item D20 which stores information to specify printers and an item D21 which stores acquired public keys in a one-to-one correspondence with the printers. As just described, the public key table TB20 can hold public keys concerning plural printers on a printer-by-printer basis. Moreover, by storing the public keys in the public key table TB20 on the hard disk 76 in this manner, even when the print client 20 is powered off and then powered on again, the public keys acquired before the power-on can be read from the hard disk 76 and used as they are.

Thereafter, the print client 20 ends the connection with the printer 30 (step S132).

On the other hand, when it is judged in step S124 that the authentication has not been accepted (step S124: No), the print client 20 notifies the user that the authentication has not been accepted by the printer 30, whereby the public key cannot be acquired (step S134). Then the print client 20 ends the connection with the printer 30 (step S132).

Thus, the public key request process shown in FIG. 8 is completed. Incidentally, the authentication process in step S122, step S124, and step S134 is not always necessary and it is possible to omit this authentication process.

Figure 10:
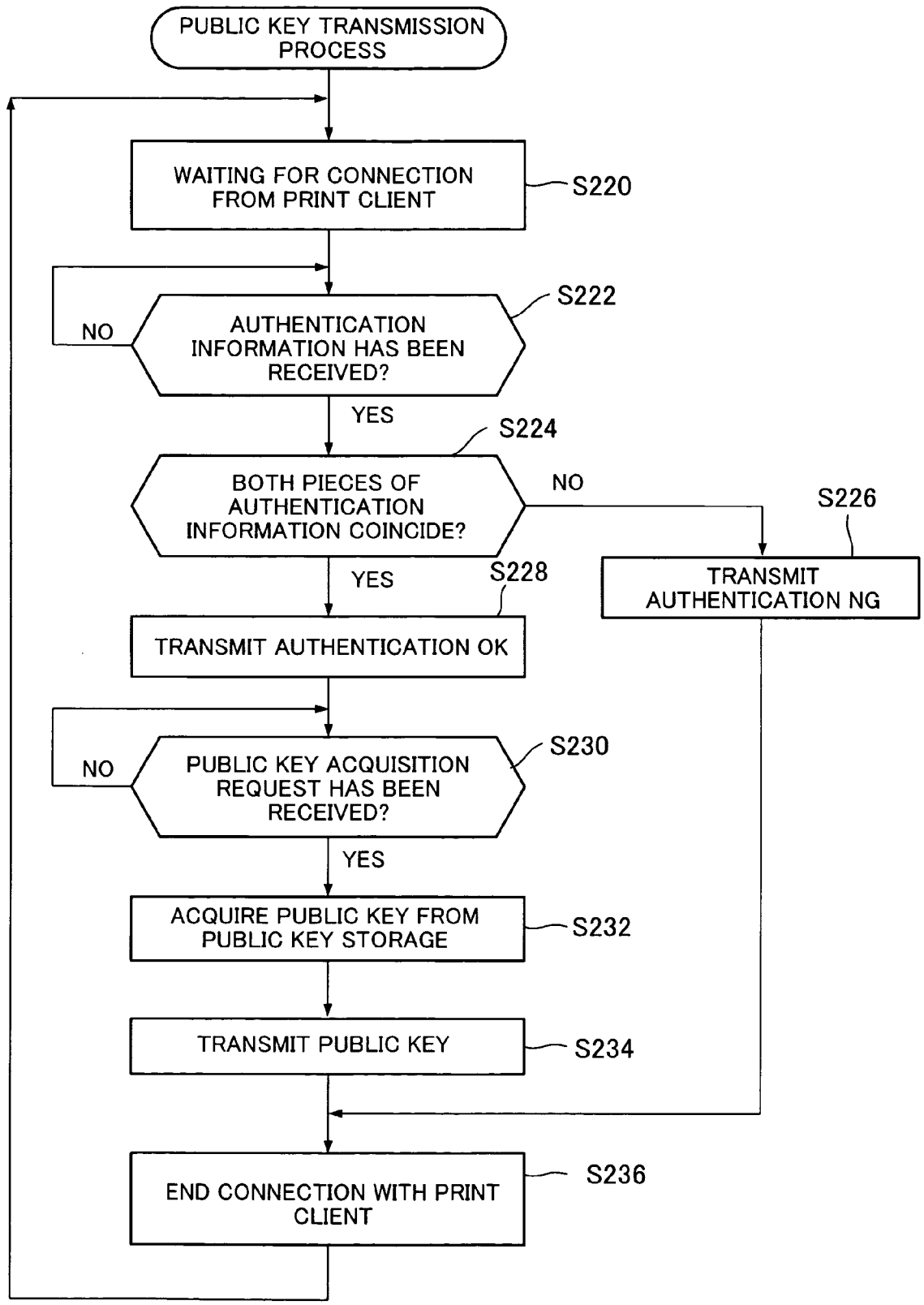
FIG. 10 is a flowchart explaining a public key transmission process in the first embodiment.

Next, a public key transmission process executed in the printer 30 corresponding to the public key request process in the print client 20 will be explained based on FIG. 10. FIG. 10 is a flowchart explaining the public key transmission process executed in the printer 30. The public key transmission process is realized by making the CPU 40 read and execute a public key transmission program stored in the ROM 44 of the printer. In this embodiment, this public key transmission process is regularly executed at given time intervals. Moreover, this public key transmission process corresponds to the aforementioned public key request process.

As shown in FIG. 10, the printer 30 is waiting for a connection from the print client 20, and establishes a connection with the print client 20 when the connection is requested by the print client 20 (step S220). Subsequently, the printer 30 judges whether the authentication information has been received from the print client 20 (step S222). When the authentication information has not been received (step S222: No), the printer 30 stands by while repeating the process in step S222.

On the other hand, when the authentication information has been received from the print client 20 (step S222: Yes), the printer 30 judges whether this authentication information coincides with authentication information previously registered with the printer 30 (step S224). More specifically, since the print client ID and the password are transmitted as the authentication information from the print client 20 as described above, the printer 30 judges whether these client ID and password coincide with a print client ID and a password which are previously registered with the printer 30.

When these two pieces of authentication information do not coincide (step S224: No), the printer 30 transmits the authentication result indicating that the authentication has not been accepted to the print client 20 (step S226), and in step S236 described later, ends the connection with the print client 20 (step S236). On the other hand, when these two pieces of authentication information coincide (step S224: Yes), the printer 30 transmits the authentication result indicating that the authentication has been accepted to the print client 20 (step S228).

Thereafter, the printer 30 judges whether the public key acquisition request has been received from the print client 20 (step S230). When the public key acquisition request has not been received (step S230: No), the printer 30 stands by while repeating the process in step S230.

When the public key acquisition request has been received (step S230: Yes), the printer 30 reads and acquires the public key from the public key storage TB10 of the EEPROM 56 (step S232). Subsequently, the printer 30 transmits the acquired public key to the print client 20 (step S234). Then, the printer 30 ends the connection with the print client 20 (step S236) and returns to the process in step S220.

Incidentally, as described above, the process for authenticating the print client 20 can be omitted. In this case, the process in step S222, step S224, step S226, and step S228 can be omitted.

Next, processes in the print client 20 and the printer 30 when the print client 20 transmits a print request to the printer 30 will be explained in detail.

Figure 11:
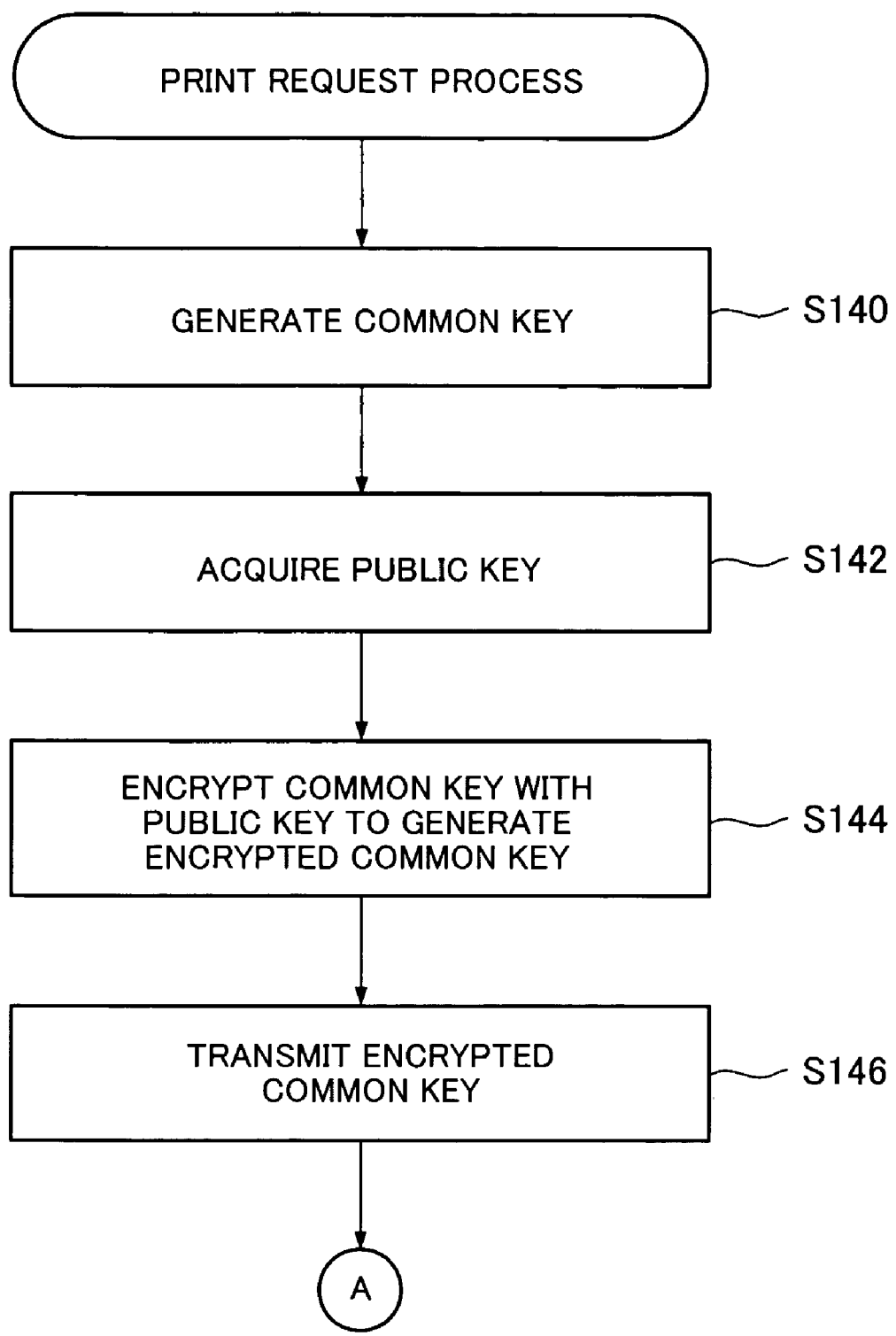
FIG. 11 is a flowchart explaining a print request process in the first embodiment (First part)
Figure 12:
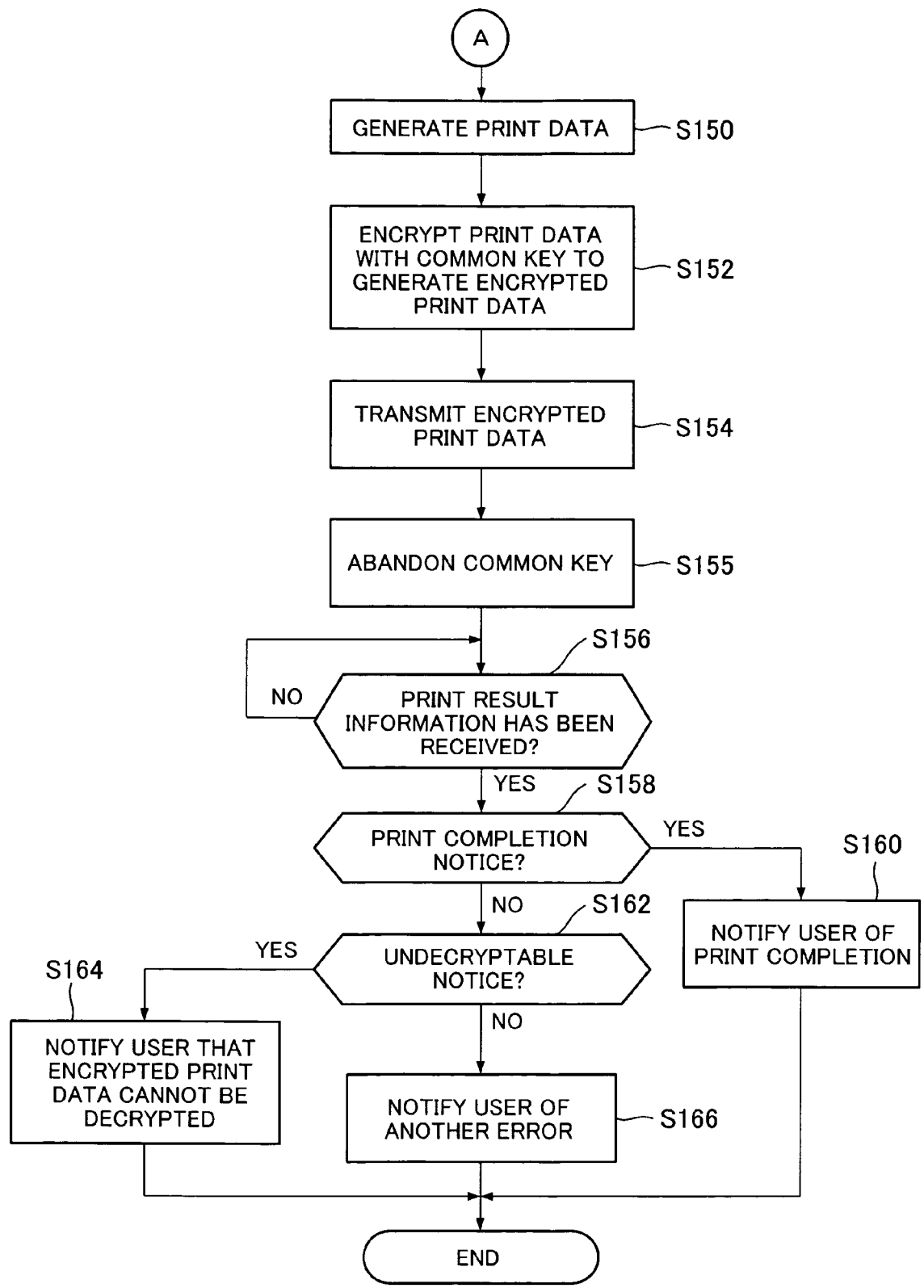
FIG. 12 is a flowchart explaining the print request process in the first embodiment (Second part)

FIG. 11 and FIG. 12 are flowcharts explaining a print request process executed in the print client 20. This print request process is realized by making the CPU 64 read and execute a print request program stored in the ROM 68 or the hard disk 76 of the print client. In this embodiment, this print request process is started when the user creates data to be printed and instructs the print client 20 to print the data with the printer 30.

As shown in FIG. 11, the print client 20 generates a common key, for example, with a random number (step S140). Various common key cryptographies such as the DES (data encryption standard) method, triple DES, and Rijndael are known.

Then, the print client 20 reads and acquires the public key of the printer 30 from the public key table TB20 (step S142). Subsequently, the print client 20 encrypts the common key with the public key acquired in step S142 to generate an encrypted common key (step S144).

Thereafter, the print client 20 transmits the encrypted common key to the printer 30 (step S146). More specifically, the print client 20 designates the network address of the printer 30 and sends out the encrypted common key to the network 10.

Subsequently, as shown in FIG. 12, the print client 20 generates print data (step S150). This print data is data necessary for an actual print operation of the printer 30.

Then, the print client 20 encrypts the print data with the common key generated in step S140 to generate encrypted print data (step S152). Subsequently, the print client 20 transmits this encrypted print data to the printer 30 (step S154). More specifically, the print client 20 designates the network address of the printer 30 and sends out the encrypted print data to the network 10. Then, the print client 20 abandons the common key (step S155).

Thereafter, the print client 20 judges whether print result information has been received from the printer 30 (step S156). When the print result information has not been received (step S156: No), the print client 20 stands by while repeating the process in step S156. On the other hand, when the print result information has been received (step S156: Yes), the print client 20 judges whether the print result information is a print completion notice (step S158).

When this print result information is the print completion notice (step S158: Yes), it means that the printer 30 has properly completed the print operation, and hence the print client 20 notifies the user that the printer 30 has completed the print operation (step S160). On the other hand, when the received print result information is not the print completion notice (step S158: No), whether the print result information is an undecryptable notice is judged (step S162).

When the print result information is the undecryptable notice (step S162: Yes), the print client 20 notifies the user that since the encrypted print data cannot be decrypted by the printer 30, the print operation has not been executed (step S164). On the other hand, when the print result information is not the undecryptable notice (step S162: No), some other error is thought to occur, and hence the print client 20 gives notice according to the type of the error to the user (step S166).

By the notice in step S160, step S164, or step S166, the print request process in the print client 20 is completed.

Figure 13:
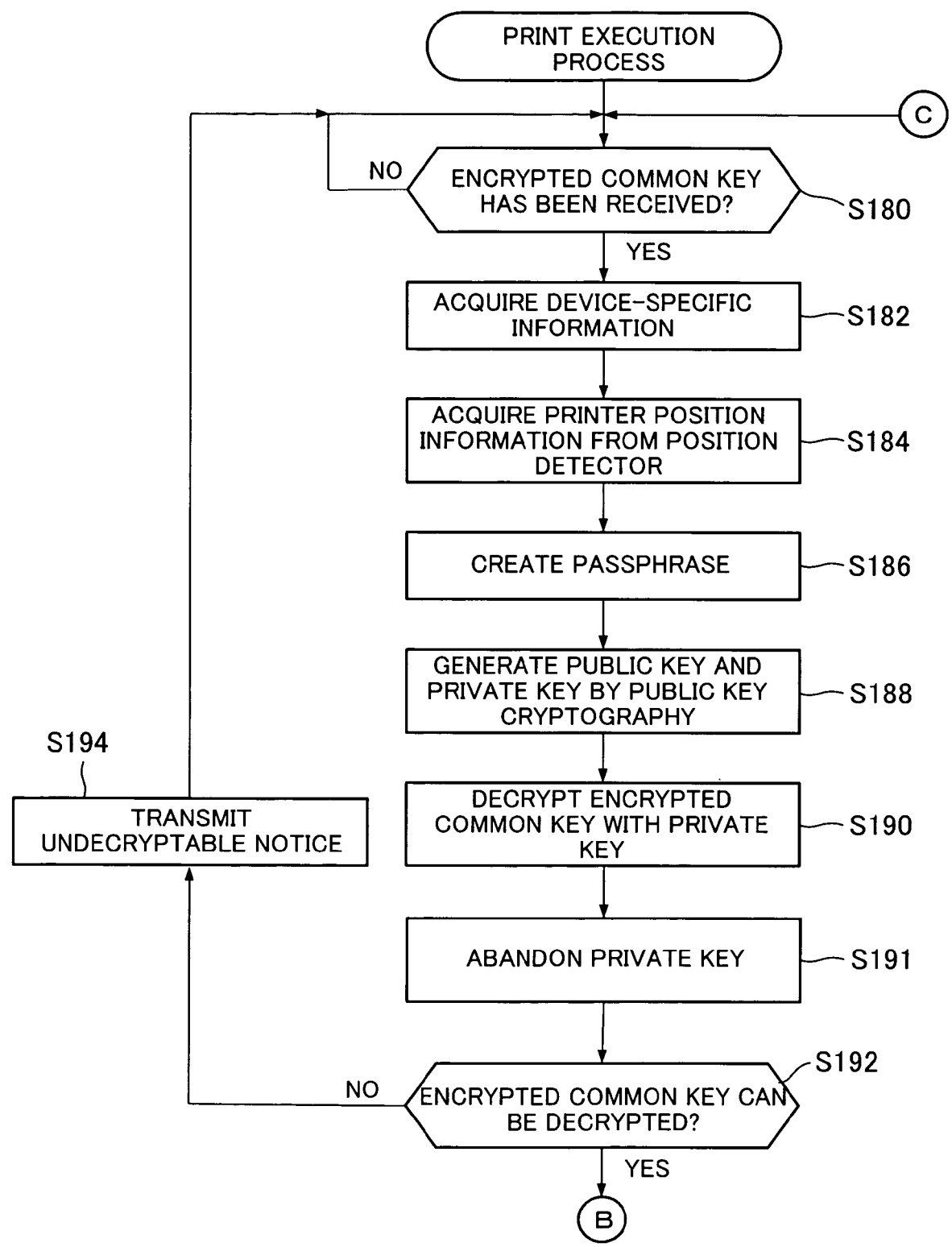
FIG. 13 is a flowchart explaining a print execution process executed in the first embodiment (First part)
Figure 14:
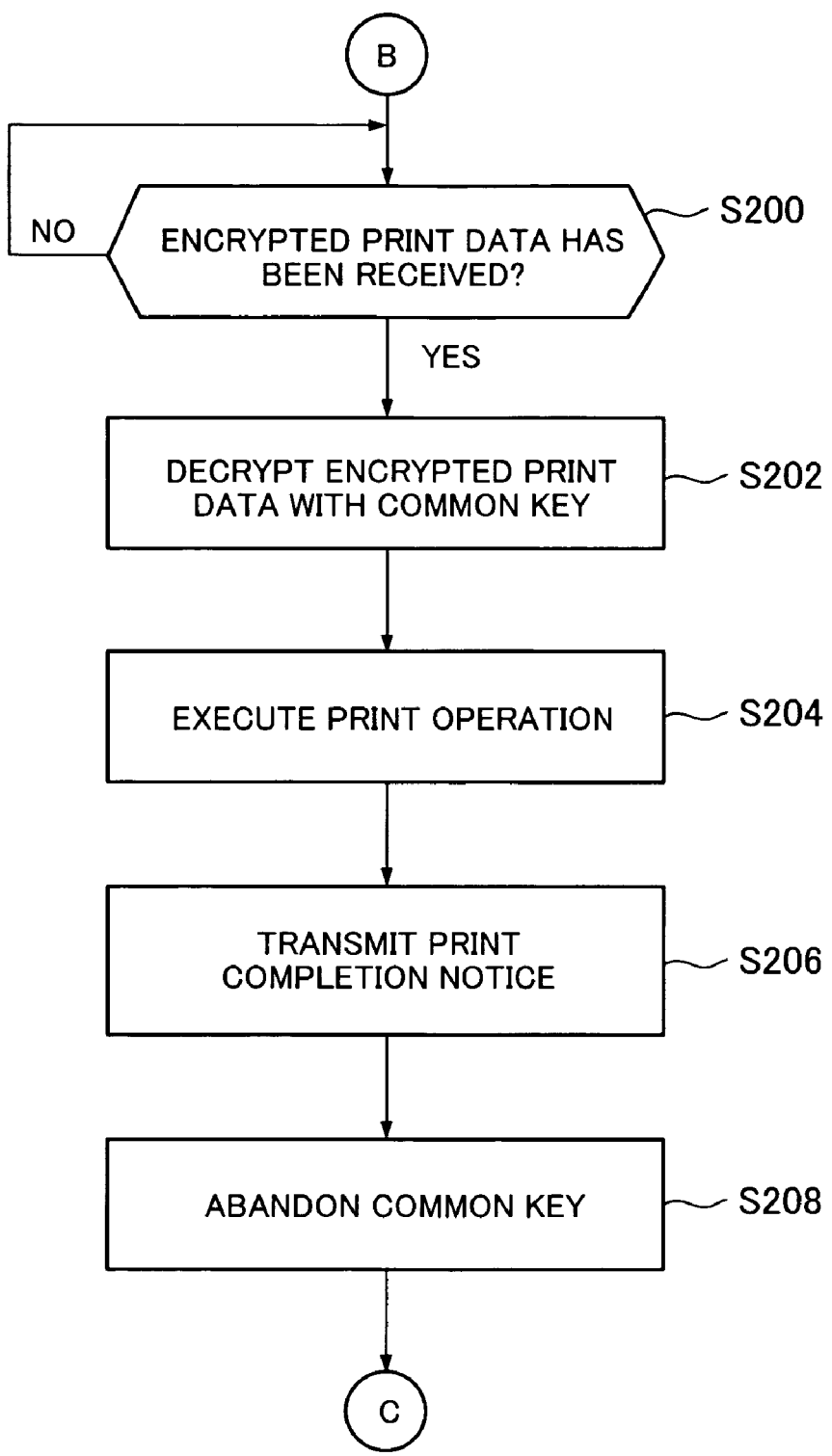
FIG. 14 is a flowchart explaining the print execution process in the first embodiment (Second part)

Next, a print execution process executed in the printer 30 corresponding to the print request process in the print client 20 will be explained based on FIG. 13 and FIG. 14. FIG. 13 and FIG. 14 are flowcharts explaining the print execution process executed in the printer 30. This print execution process is realized by making the CPU 40 read and execute a print execution program stored in the ROM 44 of the printer 30. In this embodiment, this print execution process is regularly executed.

As shown in FIG. 13, the printer 30 judges whether the encrypted common key has been received from the network 10 (step S180). When the encrypted common key has not been received (step S180: No), the printer 30 stands by while repeating the process in step S180.

On the other hand, when the encrypted common key has been received (step S180: Yes), the printer 30 acquires its own device-specific information (step S182). Subsequently, the printer 30 acquires printer position information on the printer 30 at this point in time from the position detector 54 (step S184). The reason why the printer position information is acquired from the position detector 54 each time as just described is that there is a possibility that the printer is moved to a different place from a place where the printer 30 was initially installed, and in order that, in such a case, the print operation will not be executed by the printer 30.

Then, the printer 30 creates a passphrase based on the device-specific information and the printer position information (step S186). The method of creating the passphrase needs to be the same method as in step S510 in the aforementioned public key generation process. This is because, if the passphrases are different, the encrypted common key transmitted from the print client 20 cannot be decrypted with a private key.

Thereafter, the printer 30 generates a public key and a private key with the passphrase by the public key cryptography (step S188). Subsequently, the printer 30 decrypts the received encrypted common key with the generated private key and acquires the common key (step S190). Then, the printer 30 abandons the private key used in step S190 (step S191).

Thereafter, the printer 30 judges whether the encrypted common key can be decrypted with the private key (step S192). When the encrypted common key cannot be decrypted (step S192: No), the printer 30 transmits the undecryptable notice as the print result information to the print client 20 (step S194), and returns to the aforementioned process in step S180. Namely, when places when the public key generation process was executed and when this print execution process is executed are different, it means that the printer 30 has been moved to a different place, and hence the private key to decrypt the encrypted common key cannot be generated. Accordingly, the printer 30 cannot execute a print operation.

On the other hand, when the encrypted common key can be decrypted with the private key (step S192: Yes), as shown in FIG. 14, the printer 30 judges whether the encrypted print data has been received from the print client 20 (step S200). When the encrypted print data has not been received (step S200: No), the printer 30 stands by while repeating the process in step S200.

On the other hand, when the encrypted print data has been received (step S200: Yes), the printer 30 decrypts this received encrypted print data with the common key decrypted in step S190 to acquire the print data (S202). Subsequently, the printer 30 executes a print operation by driving the print engine 52 based on the acquired print data (step S204). More specifically, the printer 30 performs a language interpretation of the print data and generates print request data fitting the print engine 52. Then, by transmitting this print request data to the print engine 52, print sheets or the like are printed by the print engine 52.

At a point in time when the print operation has been properly completed, the printer 30 transmits the print completion notice that the print operation has been properly completed as the print result information to the print client 20 (step S206). Then, the printer 30 abandons the common key acquired in step S190 (step S208). Thereafter, the printer 30 returns to the aforementioned process in step S180.

Figure 15:
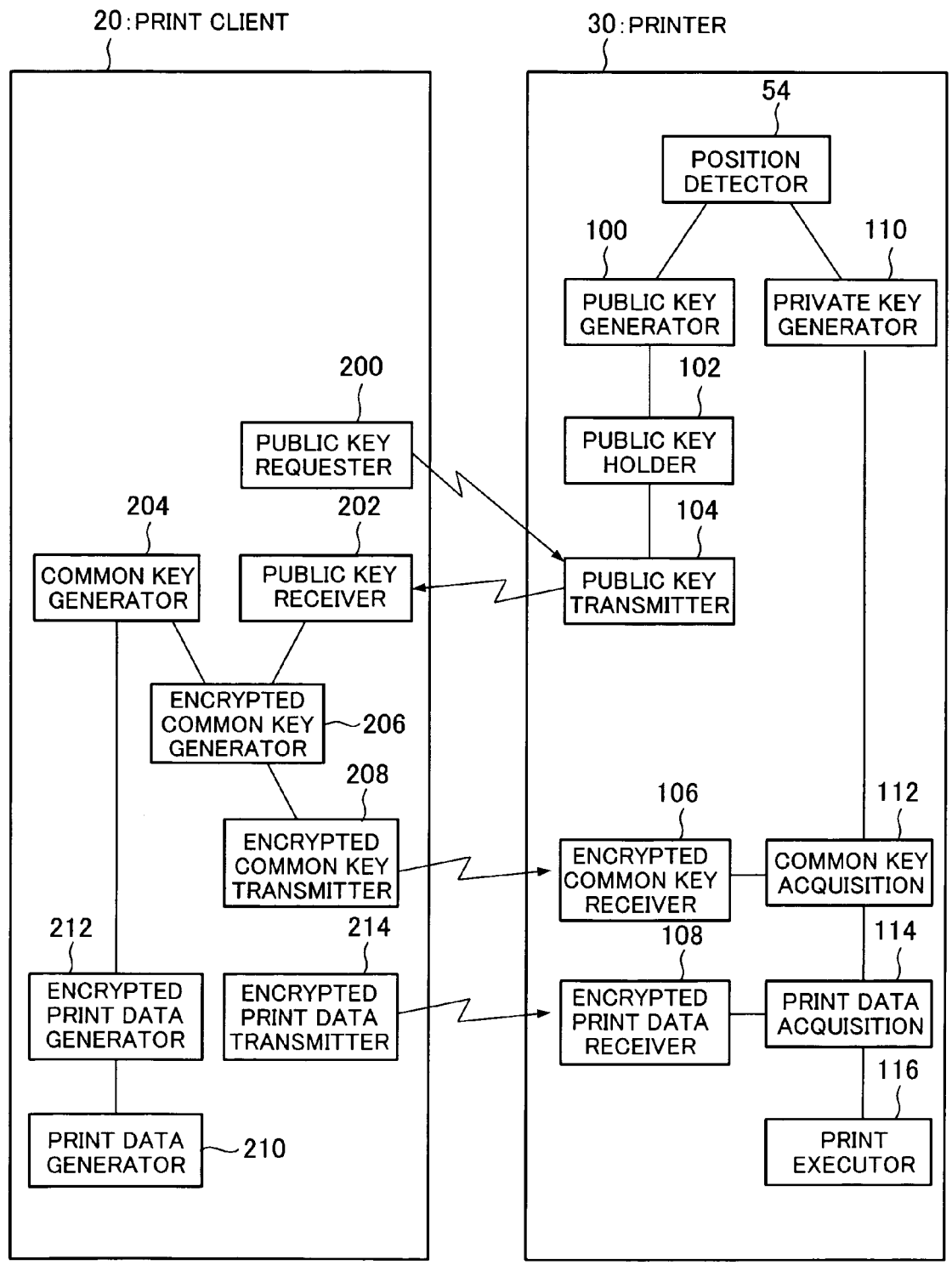
FIG. 15 is a functional block diagram showing a case where the processes of the print system according to the first embodiment are realized by hardware.

FIG. 15 is a functional block diagram showing a configuration when the aforementioned respective processes are realized by hardware. As shown in FIG. 15, in the printer 30, a public key generator 100 acquires printer position information from the position detector 54 and generates a public key with a passphrase containing this printer position information and device-specific information. A public key holder 102 holds the public key generated by the public key generator 100.

In the print client 20, a public key requester 200 generates a public key transmission request to request public key transmission and transmits it to the printer 30 at any given timing. In the printer 30 which has accepted this public key transmission request, a public key transmitter 104 reads the public key held in the public key holder 102 and transmits this public key to the print client 20.

In the print client 20, a public key receiver 200 receives the public key transmitted from the printer 30. A common key generator 204 generates a common key, and an encrypted common key generator 206 encrypts this common key with the public key to generate an encrypted common key. Then, an encrypted common key transmitter 208 transmits the generated encrypted common key from the print client 20 to the printer 30.

Moreover, in the print client 20, a print data generator 210 generates print data, and an encrypted print data generator 212 encrypts this print data with the common key to generate encrypted print data. Then, an encrypted print data transmitter 214 transmits this encrypted print data from the print client 20 to the printer 30.

In contrast, in the printer 30, an encrypted common key receiver 106 receives the encrypted common key transmitted from the print client 20, and an encrypted print data receiver 108 receives the encrypted print data transmitted from the print client 20. Further, a private key generator 110 acquires printer position information from the position detector 54 and generates a private key with a passphrase containing this printer position information and the device-specific information.

A common key acquisition 112 decrypts the encrypted common key received by the encrypted common key receiver 106 with the private key generated by the private key generator 110 to acquire the common key. Then, a print data acquisition 114 decrypts the encrypted print data received by the encrypted print data receiver 108 with the acquired common key to acquire the print data. A print executor 116 prints the print data by actually driving the print engine 52.

As described above, according to the print system of this embodiment, the printer 30 can execute a proper print operation only in a place where the public key was generated, whereby the place where the printer 30 can be used can be limited to the place where the public key was generated. Namely, in the printer 30 of this embodiment, when the printer is moved to a place different from the place where the public key was generated, the encrypted common key transmitted from the print client 20 cannot be decrypted correctly, so that the correct common key cannot be acquired. Therefore, the encrypted print data encrypted with the common key on the print client 20 side cannot be decrypted.

Moreover, in this embodiment, the print data is encrypted with the common key. It is generally said that the speed at which data is decrypted with a common key by the common key cryptography is approximately 1000 times higher than the speed at which the data is decrypted with a private key by the public key cryptography. Hence, print data with a large data amount can be decrypted rapidly with the common key.

Further, along with the above, according to the print system of this embodiment, the print client 20 can substantially restrict the printer able to print the encrypted print data which is encrypted and then transmitted, so that the execution of a print operation by a printer installed in a position where the user of the print client 20 does not intend to perform printing can be avoided.

Second Embodiment

In the aforementioned first embodiment, the private key used for decrypting the encrypted common key is abandoned in step S191. However, in some cases, some cost such as a communication cost occurs in order to acquire printer position information from the position detector 54. In these cases, it is advantageous to the user to reduce the number of times the printer position information is acquired to the smallest possible number. Hence, in this embodiment, when the printer 30 is powered on, the printer position information is acquired from the position detector 54 to generate the private key, and this private key is stored in the RAM 42 which is a volatile memory device in which held contents are erased when the printer 30 is powered off. When the private key is needed, the printer 30 reads the private key from the RAM 42 and uses it.

Figure 16:
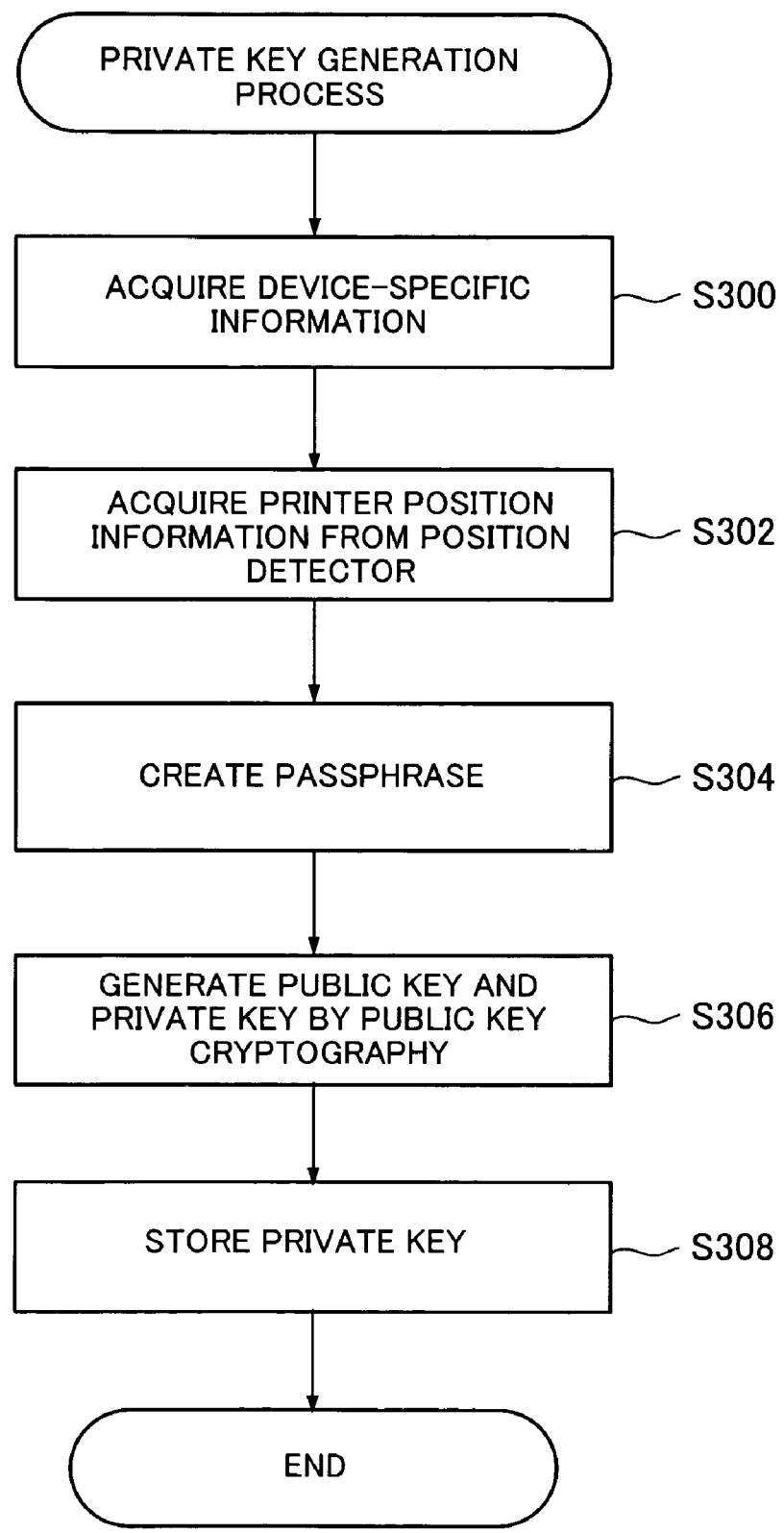
FIG. 16 is a flowchart explaining a private key generation process in a second embodiment.

FIG. 16 is a flowchart explaining a private key generation process executed in the printer 30. This private key generation process is realized by making the CPU 40 read and execute a private key generation program stored in the ROM 44 of the printer 30. In this embodiment, this private key generation process is started when the printer 30 is powered on.

As shown in FIG. 16, the printer 30 acquires its own device-specific information (step S300). Subsequently, the printer 30 acquires printer position information at this point in time from the position detector 54 (step S302). The reason why the printer position information is acquired from the position detector 54 each time as just described is that there is a possibility that the printer is moved to a different place from a place where the printer 30 was initially installed, and in order that, in such a case, the print operation will not be executed by the printer 30.

Then, the printer 30 creates a passphrase based on the device-specific information and the printer position information (step S304). The method of creating the passphrase needs to be the same method as in step S110 in the public key generation process in the first embodiment. This is because, if the passphrases are different, the encrypted common key transmitted from the print client 20 cannot be decrypted with a private key.

Thereafter, the printer 30 generates a public key and a private key with the passphrase by the public key cryptography (step S306). Subsequently, the printer 30 stores the generated private key in the RAM 42 which is the volatile memory device (step S308). Thus, the private key generation process in this embodiment is completed.

Figure 17:
FIG. 17 is a diagram showing an example of a private key storage in the second embodiment.

FIG. 17 is a diagram showing an example of a private key storage TB30 in which the private key is stored in step S308. In this embodiment, this private key storage TB30 is formed in the RAM 42. Therefore, the private key stored in the private key storage TB30 is automatically erased when the printer 30 is powered off.

Figure 18:
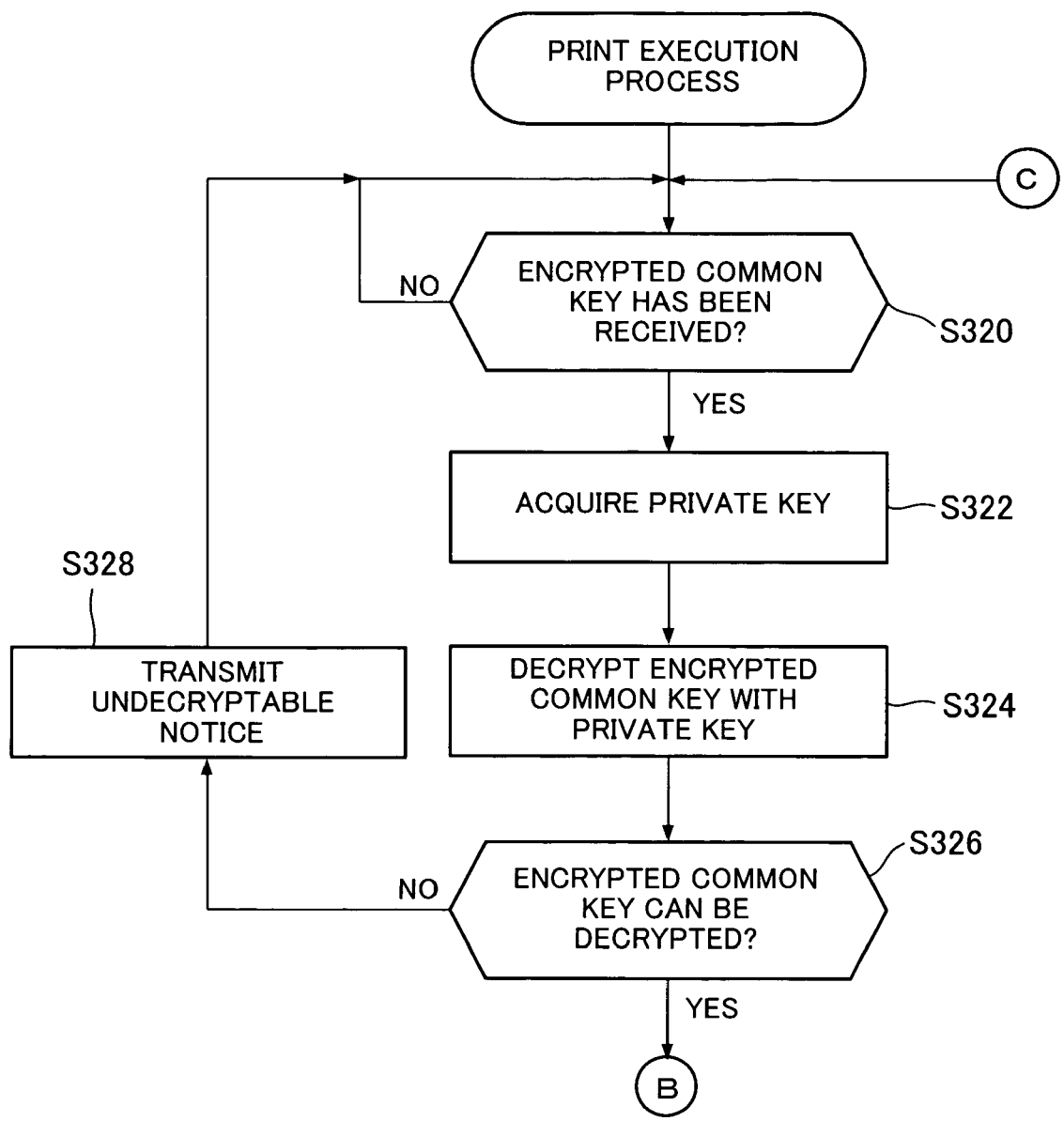
FIG. 18 is a flowchart explaining a print execution process in the second embodiment.

Next, a print execution process executed in the printer 30 corresponding to a print request process in the print client 20 will be explained based on FIG. 18. FIG. 18 is a flowchart explaining the print execution process executed in the printer 30. This print execution process is realized by making the CPU 40 read and execute a print execution program stored in the ROM 44 of the printer 30. In this embodiment, this print execution process is regularly executed.

As shown in FIG. 18, the printer 30 judges whether an encrypted common key has been received from the network 10 (step S320). When the encrypted common key has not been received (step S320: No), the printer 30 stands by while repeating the process in step S320.

On the other hand, when the encrypted common key has been received (step S320: Yes), the printer 30 reads and acquires the private key from the RAM 42 (step S322). Subsequently, the printer 30 decrypts the received encrypted common key with the acquired private key to acquire a common key (step S324).

Thereafter, the printer 30 judges whether the encrypted common key can be decrypted with the private key (step S326). When the encrypted common key cannot be decrypted (step S326: No), the printer 30 transmits an undecryptable notice as print result information to the print client 20 (step S328), and returns to the aforementioned process in step S320. Namely, when places when the public key generation process was executed and when the printer 30 is powered on this time are different, it means that the printer 30 has been moved to a different place, and hence the private key to decrypt the encrypted common key cannot be generated. Accordingly, the printer 30 cannot execute a print operation.

On the other hand, when the encrypted common key can be decrypted with the private key (step S326: Yes), the printer 30 executes the same process as in FIG. 14 in the aforementioned first embodiment.

Incidentally, processes (a public key generation process, a public key request process, a public key transmission process, and a print request process) other than the aforementioned processes are the same as those in the first embodiment, so that a detailed explanation thereof is omitted.

As described above, according to the print system of this embodiment, when the printer 30 is powered on, the printer position is acquired to generate the private key, and this private key is held in the RAM 42, whereby the private key can be read from the RAM 42 when the private key is needed. Accordingly, it becomes unnecessary to acquire printer position information from the position detector 54 each time.

Moreover, the private key is stored in the RAM 42 in which contents are erased when the printer 30 is powered off, so that when the printer 30 is powered on after the printer 30 has been moved, the printer 30 cannot execute a proper print operation any longer. Hence, the place where the printer 30 can be used can be restricted to a place where the public key was generated.

Figure 19:
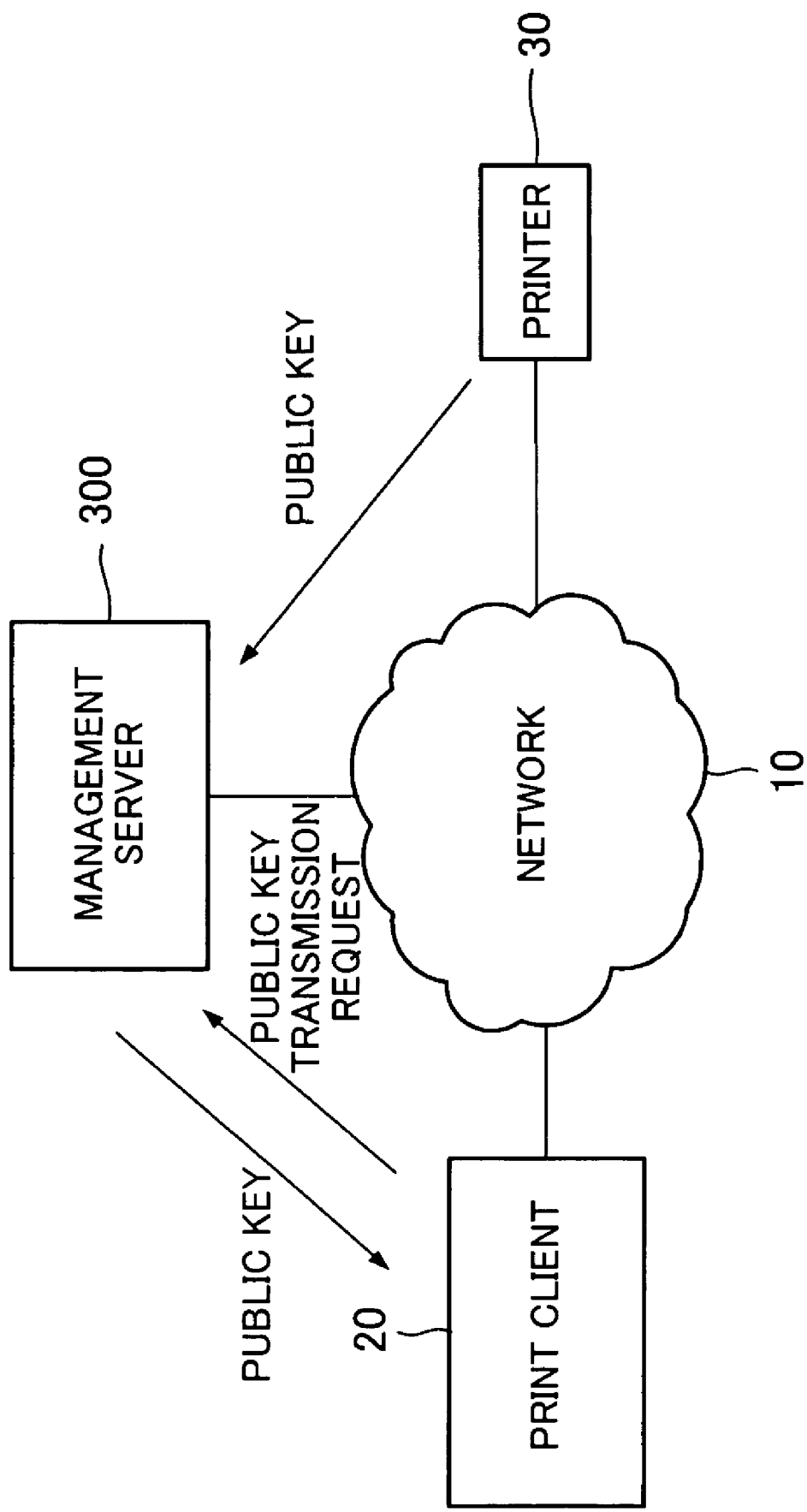
FIG. 19 is a diagram showing a modification of the first embodiment and the second embodiment.

It should be mentioned that the present invention is not limited to the aforementioned first embodiment and second embodiment, and various changes may be made therein. For example, as shown in FIG. 19, a management server which manages the public key of the printer 30 may be provided on the network 10. In this case, the printer 30 which has generated the public key transmits the public key to a management server 300 without holding the public key. The management server 300 holds this public key, and when accepting a public key transmission request from the print client 20, the management server 300 transmits the public key of the printer 30 to the print client 20. The other points are the same as those in the aforementioned embodiments.

Third Embodiment

Figure 20:
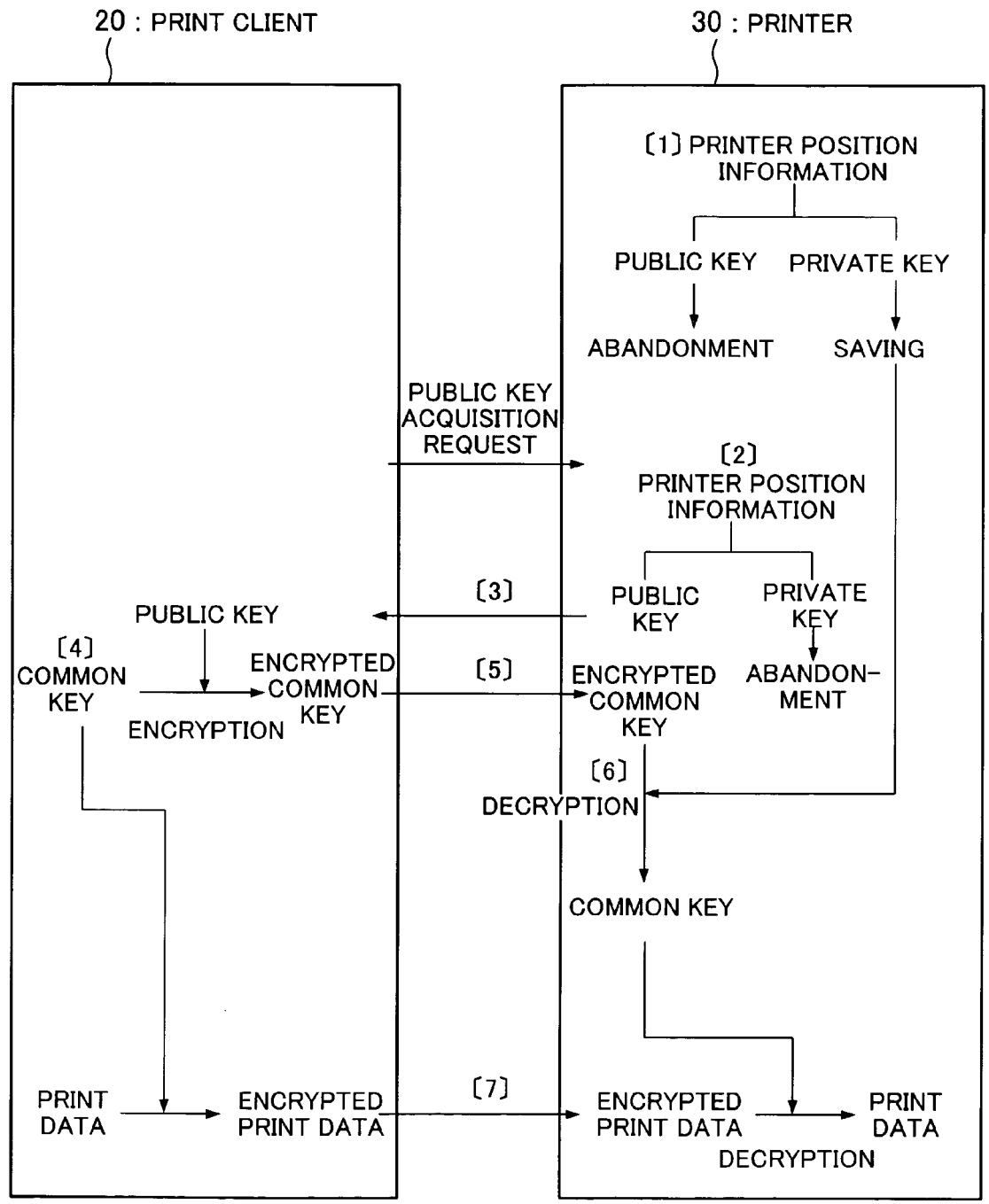
FIG. 20 is a diagram showing the uses of a common key, a public key, and a private key in a print system according to a third embodiment of the present invention.

First, a summary of a process of a print system according to the third embodiment of the present invention will be presented based on FIG. 20. As shown in FIG. 20, in this embodiment, when the printer 30 is installed, the printer 30 generates a public key and a private key with a passphrase containing at least printer position information indicating a position where the printer 30 is installed, and holds the private key but abandons the public key (step [1]).

When accepting an instruction to perform printing from the user, the print client 20 transmits a public key acquisition request to the printer 30. When receiving this public key acquisition request, the printer 30 acquires printer position information again and generates a public key and a private key with a passphrase containing at least this printer position information (step [2]). Then, the printer 30 transmits the generated public key, but abandons the generated private key (step [3]). Moreover, the public key is also abandoned in appropriate timing.

The print client 20 generates a common key with an appropriate random number or the like (step [4]), encrypts the common key with the acquired public key and transmits it as an encrypted common key to the printer 30 (step [5]).

When the encrypted common key has been received, the printer 30 reads the stored private key to decrypt the received encrypted common key (step [6]). If the position of the printer 30 is not moved from a place where the private key was generated in step [1], the printer 30 can decrypt the encrypted common key and acquire the common key. However, if the position of the printer 30 is moved from the place where the private key was generated in step [1], the printer 30 cannot decrypt the encrypted common key, and hence cannot acquire the common key.

The print client 20 encrypts print data with the common key generated in step [4], and transmits it as encrypted print data to the printer 30 (step [7]). After all, this encrypted print data can be decrypted with the common key acquired in step [6] in the printer 30 which is not moved from the installation position, but cannot be decrypted in the printer 30 which is moved therefrom. Hence, the position where the printer 30 can be properly used can be limited to the position where the private key was generated in step [1].

As can be known from the above description, the timing when the public key is transmitted from the printer 30 to the print client 20 is, in principle, immediately before the print client 20 tries to transmit the print data to the printer 30. In other words, the timing is when the print client 20 tries to request the printer 30 to perform printing.

Incidentally, it is desirable that the period during which the public key transmitted to the print client 20 can be used has an expiration date.

Moreover, the encrypted common key and the encrypted print data may be transmitted from the print client 20 to the printer 30 in the order presented, or may be transmitted in reverse order, that is, in order of the encrypted print data and the encrypted common key. Alternatively, the encrypted common key and the encrypted print data may be transmitted simultaneously as one file.

Incidentally, the configuration of the print system according to this embodiment, the internal configuration of the printer 30, and the internal configuration of the print client 20 are the same as those in the aforementioned first embodiment, so that an explanation thereof is omitted.

Next, processes executed in the printer 30 and the print client 20 to realize the process explained by means of FIG. 20 will be explained in detail.

Figure 21:
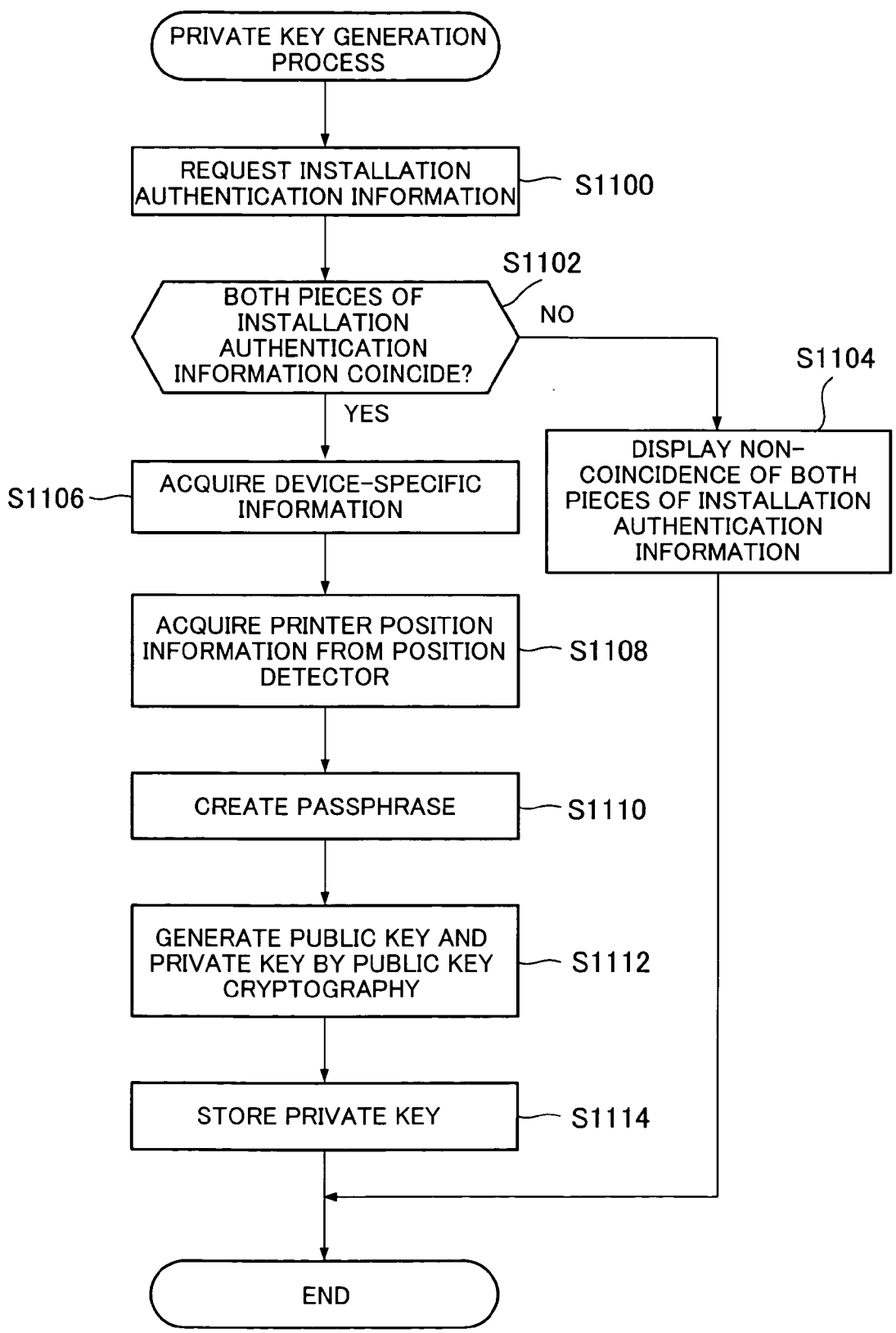
FIG. 21 is a flowchart explaining a private key generation process in the third embodiment.

First, a private key generation process executed in the printer 30 when the printer 30 is installed will be explained based on FIG. 21. FIG. 21 is a flowchart explaining the private key generation process executed in the printer 30. This private key generation process is realized by making the CPU 40 read and execute a private key generation program stored in the ROM 44 of the printer.

As shown in FIG. 21, first, the printer 30 requests an operator of the printer 30 to input installation authentication information (step S1100). For example, the printer 30 displays an instruction to input installation authentication information on a display panel provided on this printer 30. The operator, for example, operates an operation panel provided on the printer 30 to input installation authentication information. For example, in this embodiment, the installation authentication information is composed of a combination of an ID and a password for installation authentication information. Hence, the operator inputs these ID and password for installation authentication information from the operation panel.

Then, the printer 30 judges whether the inputted installation authentication information coincides with installation authentication information previously registered with this printer 30 (step S1102). More specifically, the printer 30 judges whether the ID and the password for installation authentication information inputted by the operator as described above coincide with an ID and a password for installation authentication information previously registered with the printer 30. In this embodiment, for example, when the printer 30 is shipped, these ID and password for installation authentication information are stored in the EEPROM 56, and only a manufacturer of this printer 30 can know these ID and password for installation authentication information.

When these two pieces of installation authentication information do not coincide (step S1102: No), the printer 30 displays non-coincidence of the two pieces of installation authentication information on the display panel of the printer 30 (step S1104), and completes this private key generation process.

On the other hand, when these two pieces of installation authentication information coincide (step S1102: Yes), the printer 30 acquires device-specific information on the printer 30 (step S1106). Here, the device-specific information is identification information specifically assigned to the printer 30, and it is, for example, a manufacturer's serial number, a MAC address, or the like of the printer 30.

Then, the printer 30 acquires printer position information on the printer 30 at this point in time from the position detector 54 (step S1108). Subsequently, the printer 30 creates a passphrase with the device-specific information and the printer position information (step S1110). There are various methods of creating the passphrase, and in this embodiment, the passphrase is created by simply joining the printer position information after the device-specific information. Incidentally, the passphrase may contain data other than these device-specific information and printer position information.

Thereafter, the printer 30 generates a public key and a private key with the created passphrase by the public key cryptography (step S1112). The public key cryptography has the property that the same public key and private key are generated again if the same passphrase is used. Then, the printer 30 stores and holds only the private key out of the generated public key and private key (step S1114). Incidentally, the public key is abandoned without being saved. Thus, the private key generation process according to this embodiment is completed.

Figure 22:
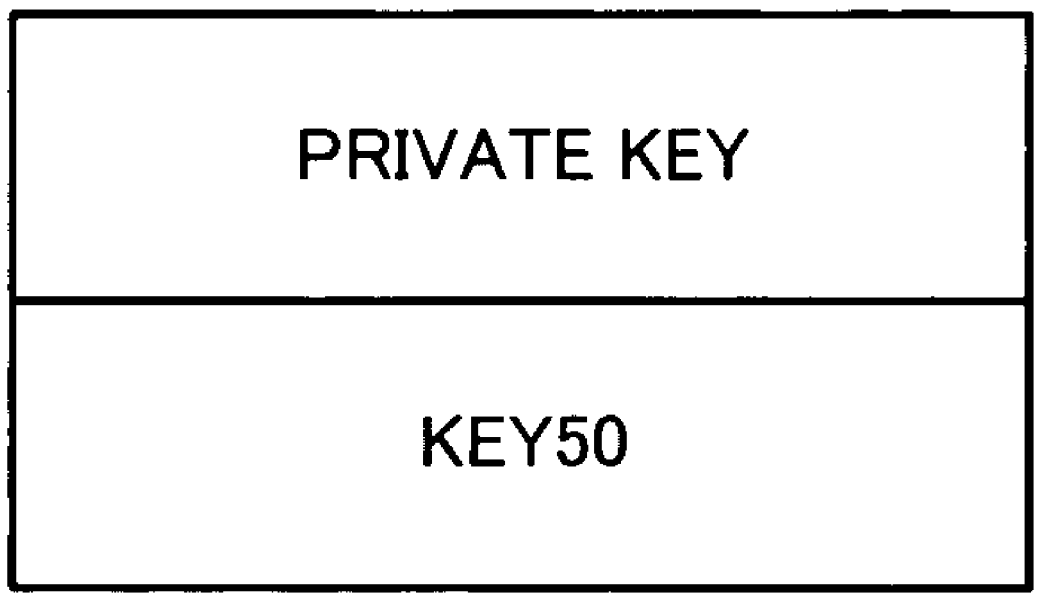
FIG. 22 is a diagram showing an example of the structure of a private key storage in the third embodiment.

FIG. 22 is a diagram showing an example of a private key storage TB50 in which the private key is stored in step S1114. In this embodiment, this private key storage TB50 is formed in the EEPROM 56. Therefore, the private key stored in the private key storage TB50 is held in a non-volatile manner even if the printer 30 is powered off.

Figure 23:
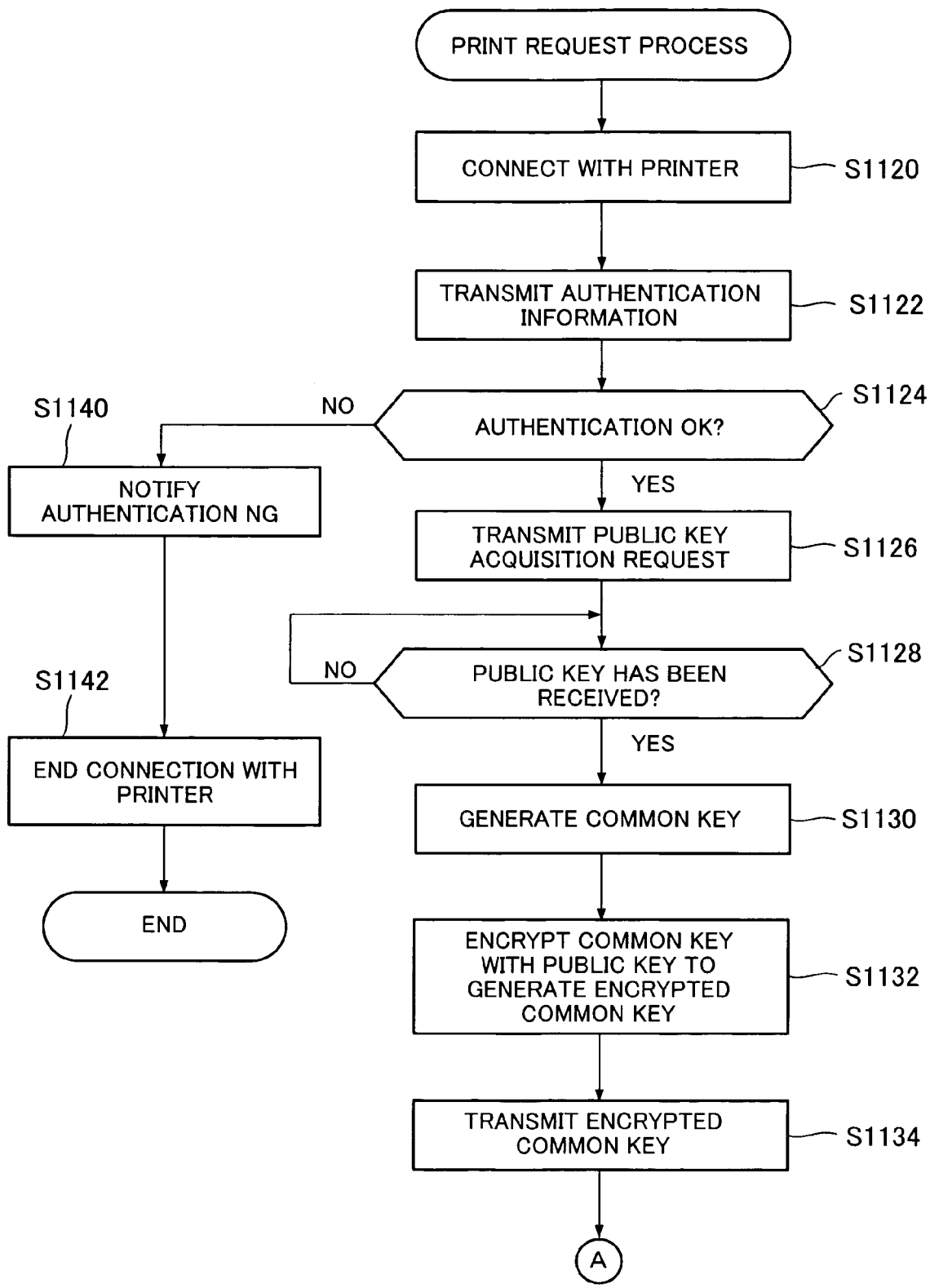
FIG. 23 is a flowchart explaining a print request process in the third embodiment (First part)
Figure 24:
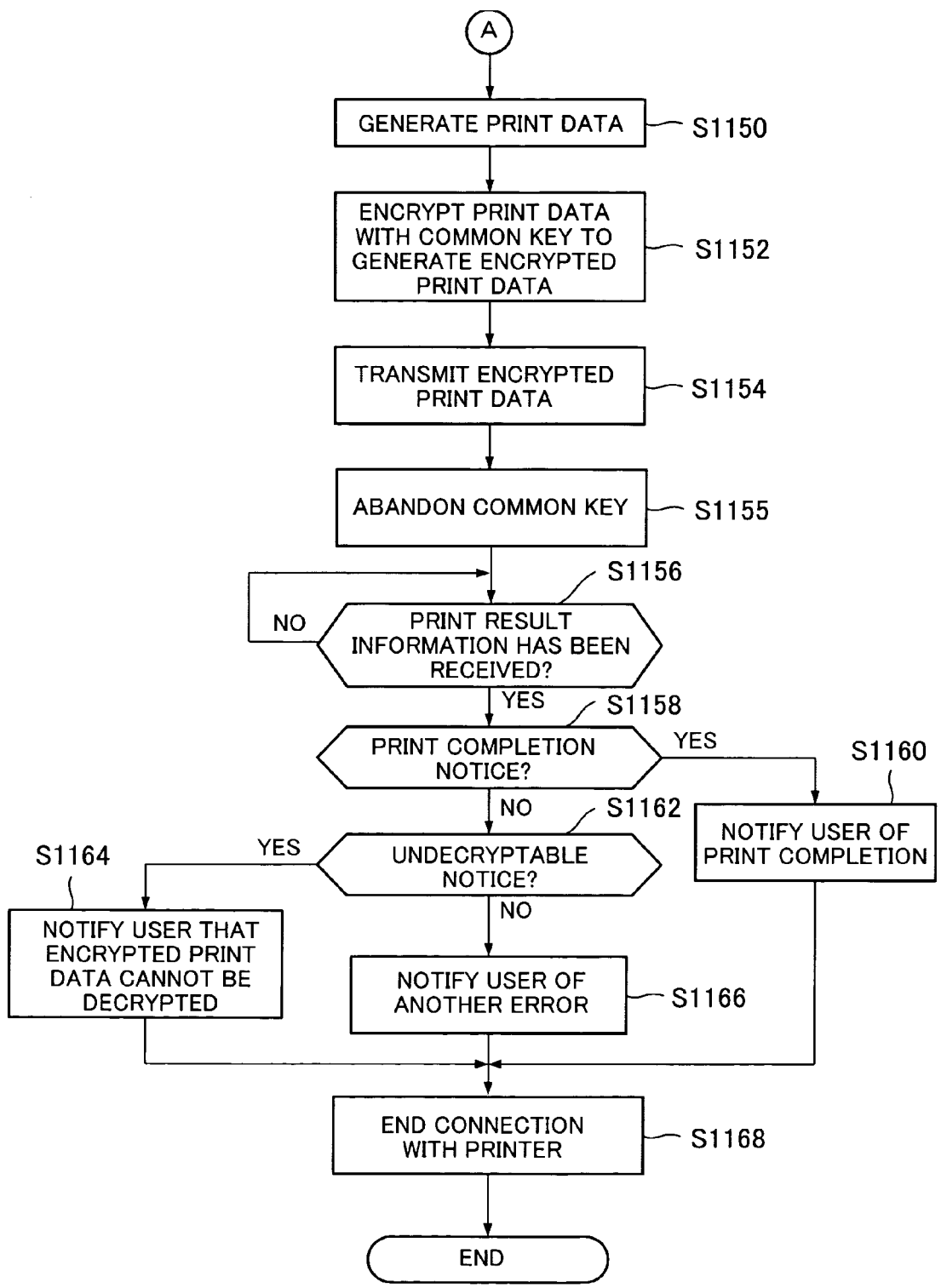
FIG. 24 is a flowchart explaining the print request process in the third embodiment (Second part)

FIG. 23 and FIG. 24 are flowcharts explaining a print request process executed in the print client 20. This print request process is realized by making the CPU 64 read and execute a print request program stored in the ROM 68 or the hard disk 76 of the print client. In this embodiment, this public key request process is started when a user creates data to be printed and instructs the print client 20 to print the data with the printer 30.

As shown in FIG. 23, in this print request process, the print client 20 first connects with the printer 30 (step S1120). In this embodiment, the print client 20 establishes a connection between the print client 20 and the printer 30 by designating the network address of the printer 30.

Thereafter, the print client 20 transmits authentication information to the printer 30 (step S1122). In this embodiment, a combination of a client ID to specify the print client and a password is used as the authentication information. Accordingly, the print client 20 transmits the client ID and the password to the printer 30.

Subsequently, the print client 20 receives an authentication result indicating whether authentication has been accepted from the printer 30, and judges whether the authentication has been accepted by the printer 30 based on the authentication result (step S1124).

When judging that the authentication has not been accepted (step S1124: No), the print client 20 notifies the user that the authentication has not been accepted by the printer 30, so that the public key cannot be acquired (step S1140). Then, the print client 20 ends the connection with the printer 30 (step S1142), and completes this print request process.

On the other hand, when judging that the authentication has been accepted (step S1124: Yes), the print client 20 transmits a public key acquisition request to the printer 30 (step S1126). Then, the print client 20 judges whether a public key has been received from the printer 30 (step S1128). When the public key has not been received from the printer 30 (step S1128: No), the print client 20 stands by while repeating the process in step S1128.

On the other hand, when the public key has been received from the printer 30 (step S1128: Yes), the print client 20 generates a common key, for example, with a random number (step S1130). Various kinds of common key cryptographies, for example, the DES (data encryption standard) method, triple DES, Rijndael, and so on are known.

Then, the print client 20 encrypts the common key generated in step S1130 with the public key received in step S1128 to generate an encrypted common key (step S1132).

Thereafter, the print client 20 transmits the encrypted common key to the printer 30 (step S1134). More specifically, the print client 20 designates the network address of the printer 30 and sends out the encrypted common key to the network 10.

Subsequently, as shown in FIG. 24, the print client 20 generates print data (step S1150). This print data is data necessary for an actual print operation of the printer 30.

Then, the print client 20 encrypts the print data with the common key generated in step S1130 to generate encrypted print data (step S1152). Subsequently, the print client 20 transmits this encrypted print data to the printer 30 (step S1154). More specifically, the print client 20 designates the network address of the printer 30 and sends out the encrypted print data to the network 10. Then, the print client 20 abandons the common key (step S1155).

Thereafter, the print client 20 judges whether print result information has been received from the printer 30 (step S1156). When the print result information has not been received (step S1156: No), the print client 20 stands by while repeating the process in step S1156. On the other hand, when the print result information has been received (step S1156: Yes), the print client 20 judges whether the print result information is a print completion notice (step S1158).

When this print result information is the print completion notice (step S1158: Yes), it means that the printer 30 has properly completed the print operation, and hence the print client 20 notifies the user that the printer 30 has completed the print operation (step S1160). On the other hand, when the received print result information is not the print completion notice (step S1158: No), whether the print result information is an undecryptable notice is judged (step S1162).

When the print result information is the undecryptable notice (step S1162: Yes), the print client 20 notifies the user that since the encrypted print data has not been decrypted by the printer 30, the print operation has not been executed (step S1164). On the other hand, when the print result information is not the undecryptable notice (step S1162: No), some other error is thought to occur, and hence the print client 20 gives notice according to the type of the error to the user (step S1166).

After the notice in step S1160, step S1164, or step S1166, the print client 20 ends the connection with the printer 30 (step S1168). Thus, the print request process in the print client 20 is completed.

Incidentally, the authentication process in step S1122, step S1124, step S1140, and step S1142 is not always necessary and it is possible to omit this authentication processes.

Figure 25:
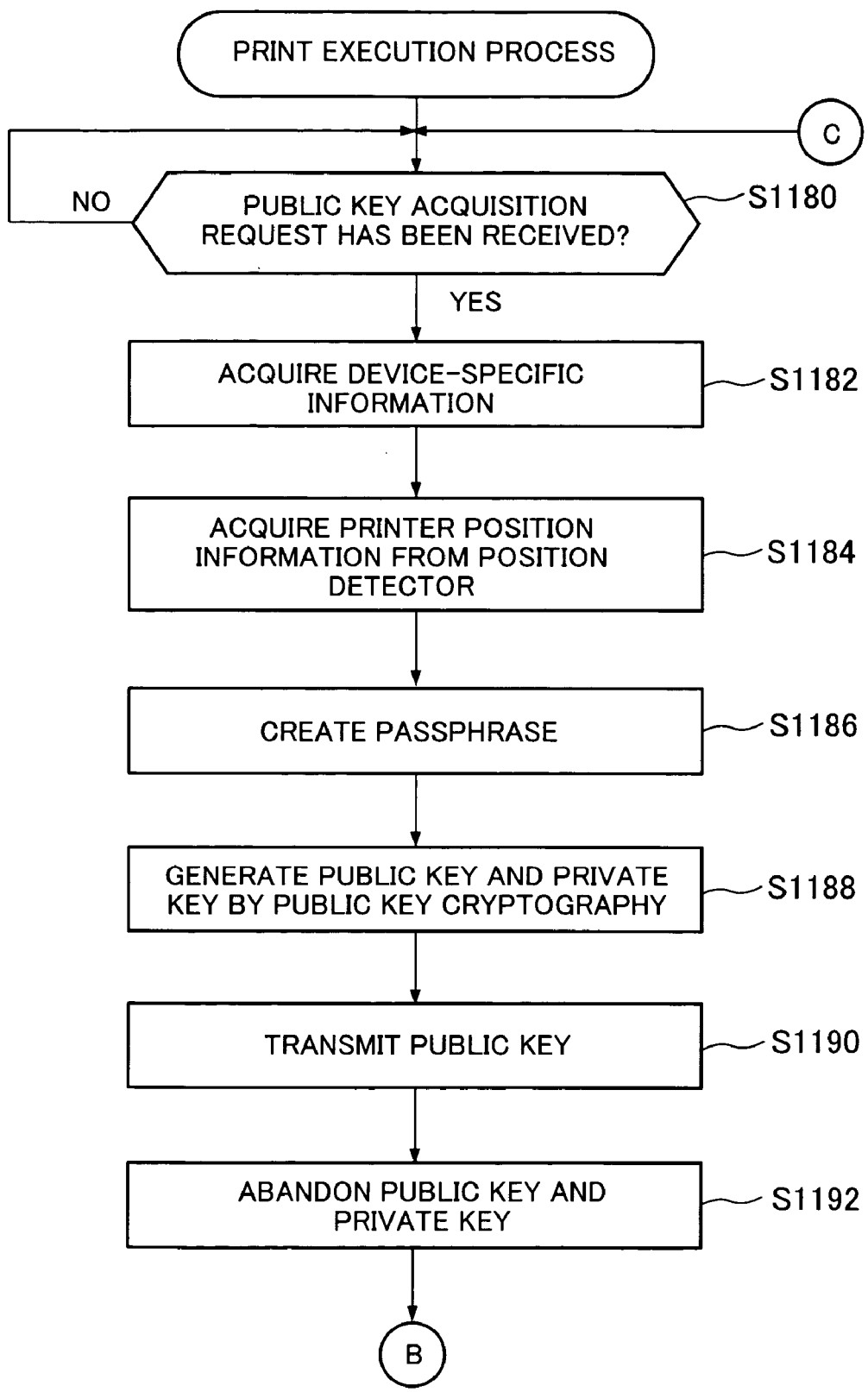
FIG. 25 is a flowchart explaining a print execution process in the third embodiment (First part)
Figure 26:
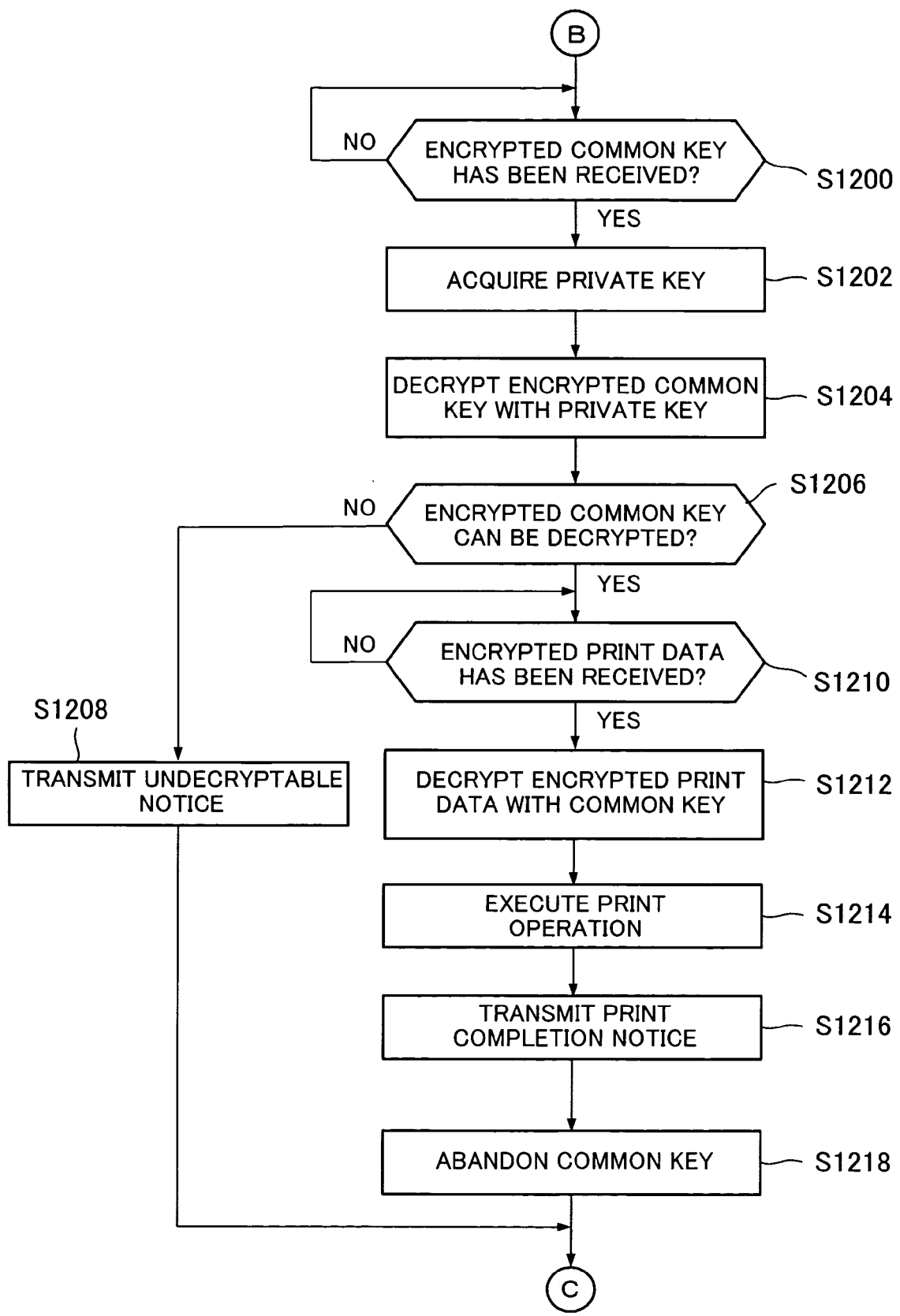
FIG. 26 is a flowchart explaining the print execution process in the third embodiment (Second part)

Next, a print execution process executed in the printer 30 corresponding to the print request process in the print client 20 will be explained based on FIG. 25 and FIG. 26. FIG. 25 and FIG. 26 are flowcharts explaining the print execution process executed in the printer 30. This print execution process is realized by making the CPU 40 read and execute a print execution program stored in the ROM 44 of the printer 30. In this embodiment, this print execution process is regularly executed.

As shown in FIG. 25, the printer 30 judges whether the public key acquisition request has been received from the network 10 (step S1180). When the public key acquisition request has not been received (step S1180: No), the printer 30 stands by while repeating the process in step S1180.

On the other hand, when the public key acquisition request has been received (step S1180: Yes), the printer 30 acquires its own device-specific information (step S1182). Subsequently, the printer 30 acquires printer position information on the printer 30 at this point in time from the position detector 54 (step S1184). The reason why the printer position information is acquired from the position detector 54 each time as just described is that there is a possibility that the printer is moved to a different place from a place where the printer 30 was initially installed, and in order that, in such a case, the print operation will not be executed by the printer 30.

Then, the printer 30 creates a passphrase based on the device-specific information and the printer position information (step S1186). The method of creating the passphrase needs to be the same method as in step S1110 in the aforementioned private key generation process. This is because, if the passphrases are different, the encrypted common key transmitted from the print client 20 cannot be decrypted with the private key held in the printer 30.

Thereafter, the printer 30 generates a public key and a private key with the passphrase by the public key cryptography (step S1188). Subsequently, the printer 30 transmits the generated public key to the print client 20 (step S1190). Then, the printer 30 abandons the public key generated in step S1188 and simultaneously, when the private key was generated in step S1188, abandons this private key (step S1192).

Thereafter, as shown in FIG. 26, the printer 30 judges whether the encrypted common key has been received from the network 10 (step S1200). When the encrypted common key has not been received (step S1200: No), the printer 30 stands by while repeating the process in step S1200.

When the encrypted common key has been received (step S1200: Yes), the printer 30 reads and acquires the private key from the private key storage TB50 (step S1202). Subsequently, the printer 30 decrypts the received encrypted common key with this private key (step S1204).

Then, the printer 30 judges whether the encrypted common key can be decrypted with the private key (step S1206). When the encrypted common key cannot be decrypted (step S1206: No), the printer 30 transmits the undecryptable notice as the print result information to the print client 20 (step S1208), and returns to the aforementioned process in step S1180. Namely, when places when the private key generation process was executed and when this print execution process is executed are different, it means that the printer 30 has been moved to a different place, and hence the encrypted common key cannot be decrypted with the private key held in the private key storage TB50. Accordingly, the printer 30 cannot execute a print operation.

On the other hand, when the encrypted common key can be decrypted with the private key (step S1206: Yes), the printer 30 judges whether the encrypted print data has been received from the print client 20 (step S1210). When the encrypted print data has not been received (step S1210: No), the printer 30 stands by while repeating the process in step S1210.

On the other hand, when the encrypted print data has been received (step S1210: Yes), the printer 30 decrypts this received encrypted print data with the common key to acquire the print data (S1212). Subsequently, the printer 30 executes a print operation by driving the print engine 52 based on the acquired print data (step S1214). More specifically, the printer 30 performs a language interpretation of the print data and generates print request data fitting the print engine 52. Then, by transmitting this print request data to the print engine 52, print sheets or the like are printed by the print engine 52.

At a point in time when the print operation has been properly completed, the printer 30 transmits the print completion notice that the print operation has been properly completed as the print result information to the print client 20 (step S1216). Then, the printer 30 abandons the common key acquired in step S1204 (step S1218). Thereafter, the printer 30 returns to the aforementioned process in step S1180.

Figure 27:
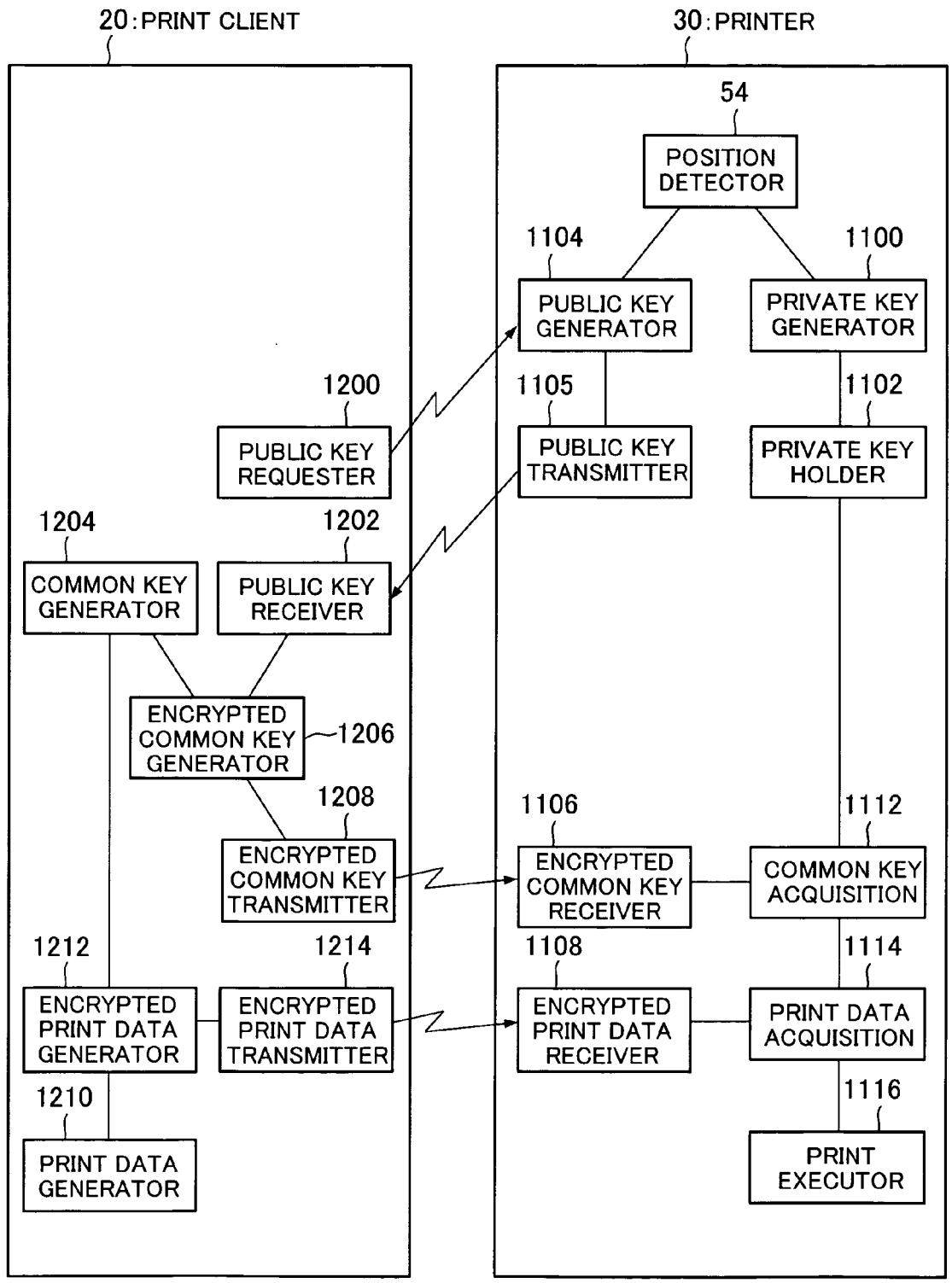
FIG. 27 is a functional block diagram showing a case where the processes of the print system according to the third embodiment are realized by hardware.

FIG. 27 is a functional block diagram showing a configuration when the aforementioned respective processes are realized by hardware. As shown in FIG. 27, in the printer 30, a private key generator 1100 acquires printer position information from the position detector 54 and generates a private key with a passphrase containing this printer position information and device-specific information. The generated private key is stored and held in a private key holder 1102.

In the print client 20, when a print request occurs, a public key requester 1200 generates a public key transmission request to request public key transmission and transmits it to the printer 30. In the printer 30 which has accepted this public key transmission request, a public key generator 1104 acquires printer position information from the position detector 54 and generates a public key with a passphrase containing this printer position information and the device-specific information. Then, a public key transmitter 1105 transmits the generated public key to the print client 20.

In the print client 20, a public key receiver 1202 receives the public key transmitted from the printer 30. A common key generator 1204 generates a common key, and an encrypted common key generator 1206 encrypts this common key with the public key to generate an encrypted common key. Then, an encrypted common key transmitter 1208 transmits the generated encrypted common key from the print client 20 to the printer 30.

Moreover, in the print client 20, a print data generator 1210 generates print data, and an encrypted print data generator 1212 encrypts this print data with the common key to generate encrypted print data. Then, an encrypted print data transmitter 1214 transmits this encrypted print data from the print client 20 to the printer 30.

In contrast, in the printer 30, an encrypted common key receiver 1106 receives the encrypted common key transmitted from the print client 20, and an encrypted print data receiver 1108 receives the encrypted print data transmitted from the print client 20.

A common key acquisition 1112 acquires the private key from the private key holder 1102 and decrypts the encrypted common key received by the encrypted common key receiver 1106 with this private key to acquire the common key. Then, a print data acquisition 1114 decrypts the encrypted print data received by the encrypted print data receiver 1108 with the acquired common key to acquire the print data. A print executor 1116 prints the print data by actually driving the print engine 52.

As described above, according to the print system of this embodiment, the printer 30 can execute a proper print operation only in a place where the public key was generated, whereby the place where the printer 30 can be used can be limited to the place where the public key was generated. Namely, in the printer 30 of this embodiment, when the printer is moved to a place different from the place where the public key was generated, the encrypted common key transmitted from the print client 20 cannot be decrypted correctly, so that the correct common key cannot be acquired. Therefore, the encrypted print data encrypted with the common key on the print client 20 side cannot be decrypted.

Moreover, in this embodiment, the print data is encrypted with the common key. It is generally said that the speed at which data is decrypted with the common key by the common key cryptography is approximately 1000 times higher than the speed at which the data is decrypted with the private key by the public key cryptography. Hence, the print data with a large data amount can be decrypted rapidly with the common key.

Further, along with the above, according to the print system of this embodiment, the print client 20 can substantially restrict the printer able to print the encrypted print data which is encrypted and then transmitted, so that the execution of a print operation by a printer installed in a position where the user of the print client 20 does not intend to perform printing can be avoided.

Fourth Embodiment

In the aforementioned third embodiment, in the printer 30, each time a public key acquisition request is received from the print client 20, the printer 30 acquires printer position information from the position detector 54 to generate a public key. However, in some cases, some cost such as a communication cost occurs in order to acquire the print position information from the position detector 54. In these cases, it is advantageous to the user to reduce the number of times the printer position information is acquired to the smallest possible number. Hence, in this embodiment, when the printer 30 is powered on, the printer position information is acquired from the position detector 54 to generate the public key, and this public key is stored in the RAM 42 which is a volatile memory device in which held contents are erased when the printer 30 is powered off. When the public key is needed, the printer 30 reads the public key from the RAM 42 and uses it.

Figure 28:
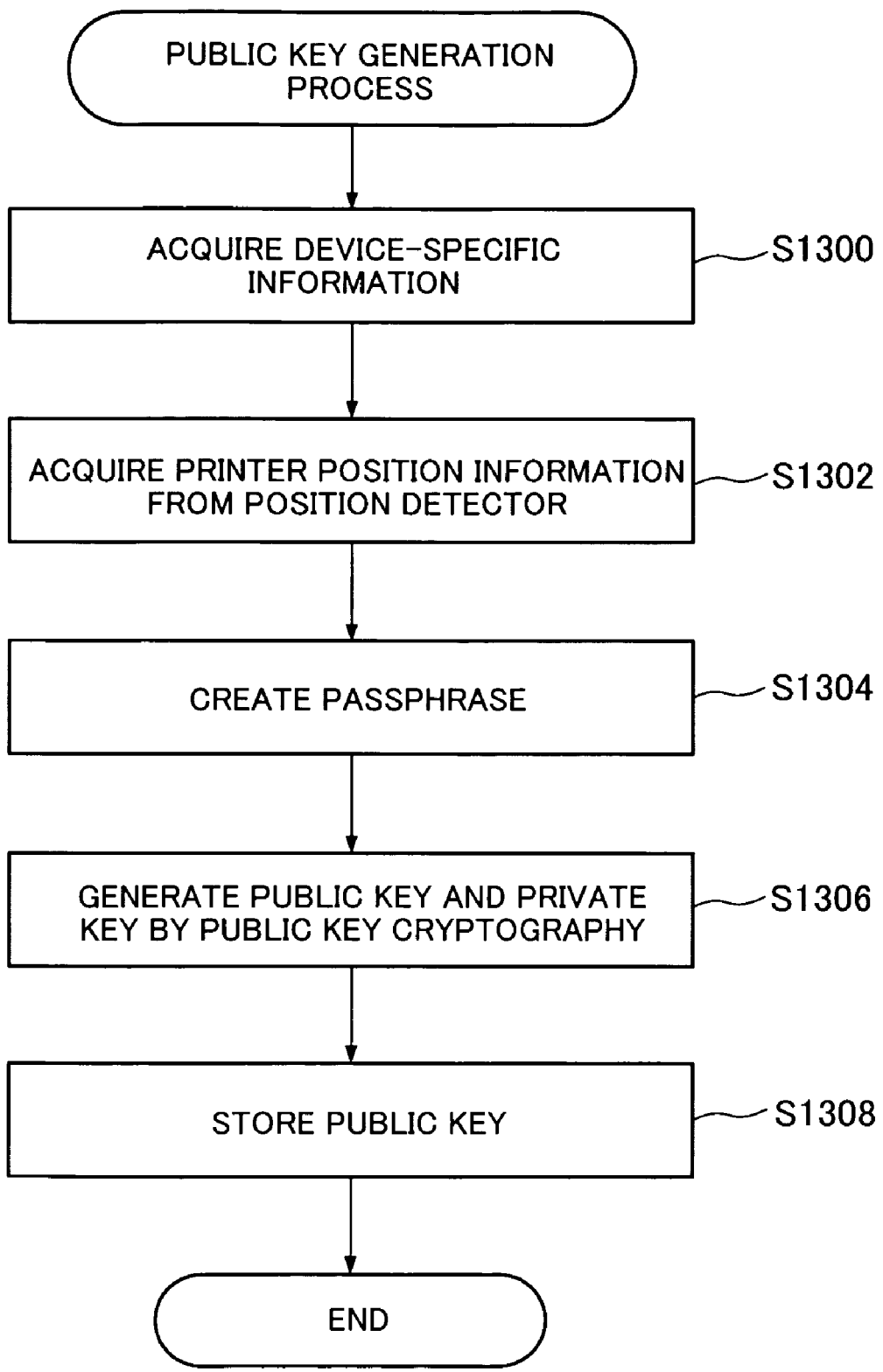
FIG. 28 is a flowchart explaining a public key generation process in a fourth embodiment.

FIG. 28 is a flowchart explaining a public key generation process executed in the printer 30. This public key generation process is realized by making the CPU 40 read and execute a public key generation program stored in the ROM 44 of the printer 30. In this embodiment, this public key generation process is started when the printer 30 is powered on.

As shown in FIG. 28, the printer 30 acquires its own device-specific information (step S1300). Subsequently, the printer 30 acquires printer position information at this point in time from the position detector 54 (step S1302). The reason why the printer position information is acquired from the position detector 54 each time as just described is that there is a possibility that the printer is moved to a different place from a place where the printer 30 was initially installed, and in order that, in such a case, the print operation will not be executed by the printer 30.

Then, the printer 30 creates a passphrase based on the device-specific information and the printer position information (step S1304). The method of creating the passphrase needs to be the same method as in step S1110 in the private key generation process in the third embodiment. This is because, if the passphrases are different, the encrypted common key transmitted from the print client 20 cannot be decrypted with the private key stored in the private key storage TB50.

Thereafter, the printer 30 generates a public key and a private key with the passphrase by the public key cryptography (step S1306). Subsequently, the printer 30 stores the generated public key in the RAM 42 which is the volatile memory device (step S1308). Thus, the public key generation process in this embodiment is completed.

Figure 29:
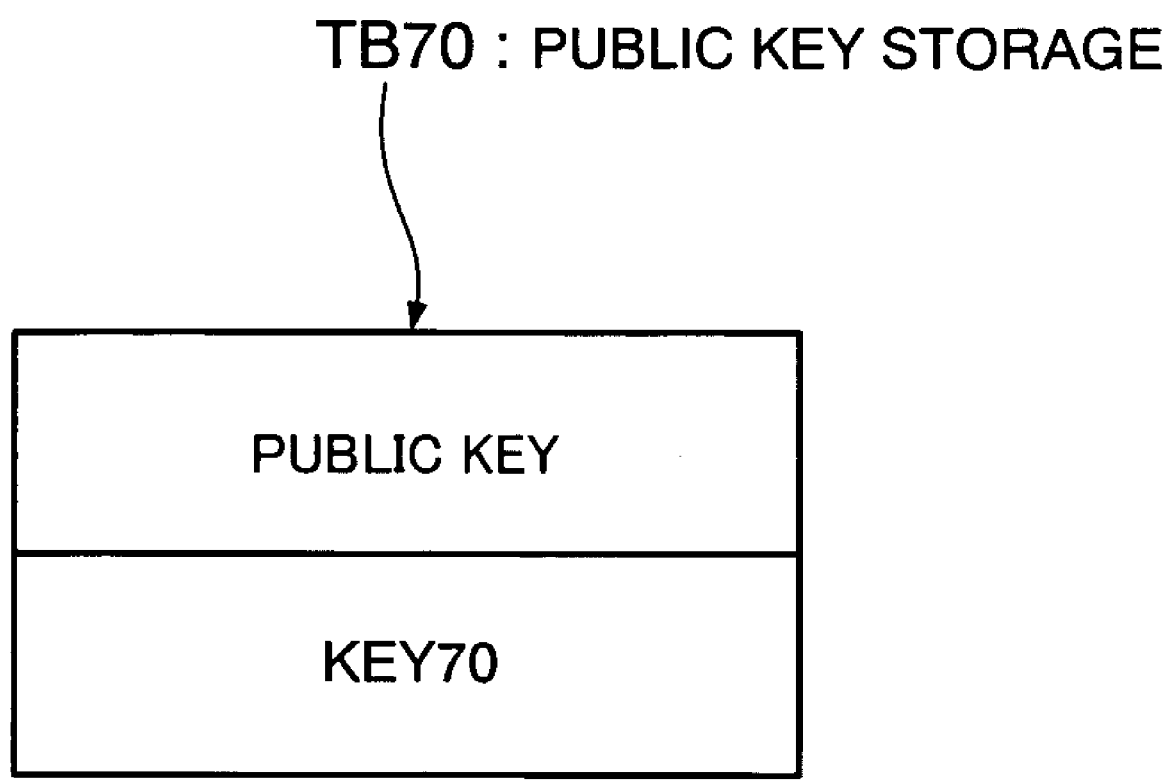
FIG. 29 is a diagram showing an example of public key storage in the fourth embodiment.

FIG. 29 is a diagram showing an example of a public key storage TB70 in which the public key is stored in step S1308. In this embodiment, this public key storage TB70 is formed in the RAM 42. Therefore, the public key stored in the public key storage TB70 is automatically erased when the printer 30 is powered off.

Figure 30:
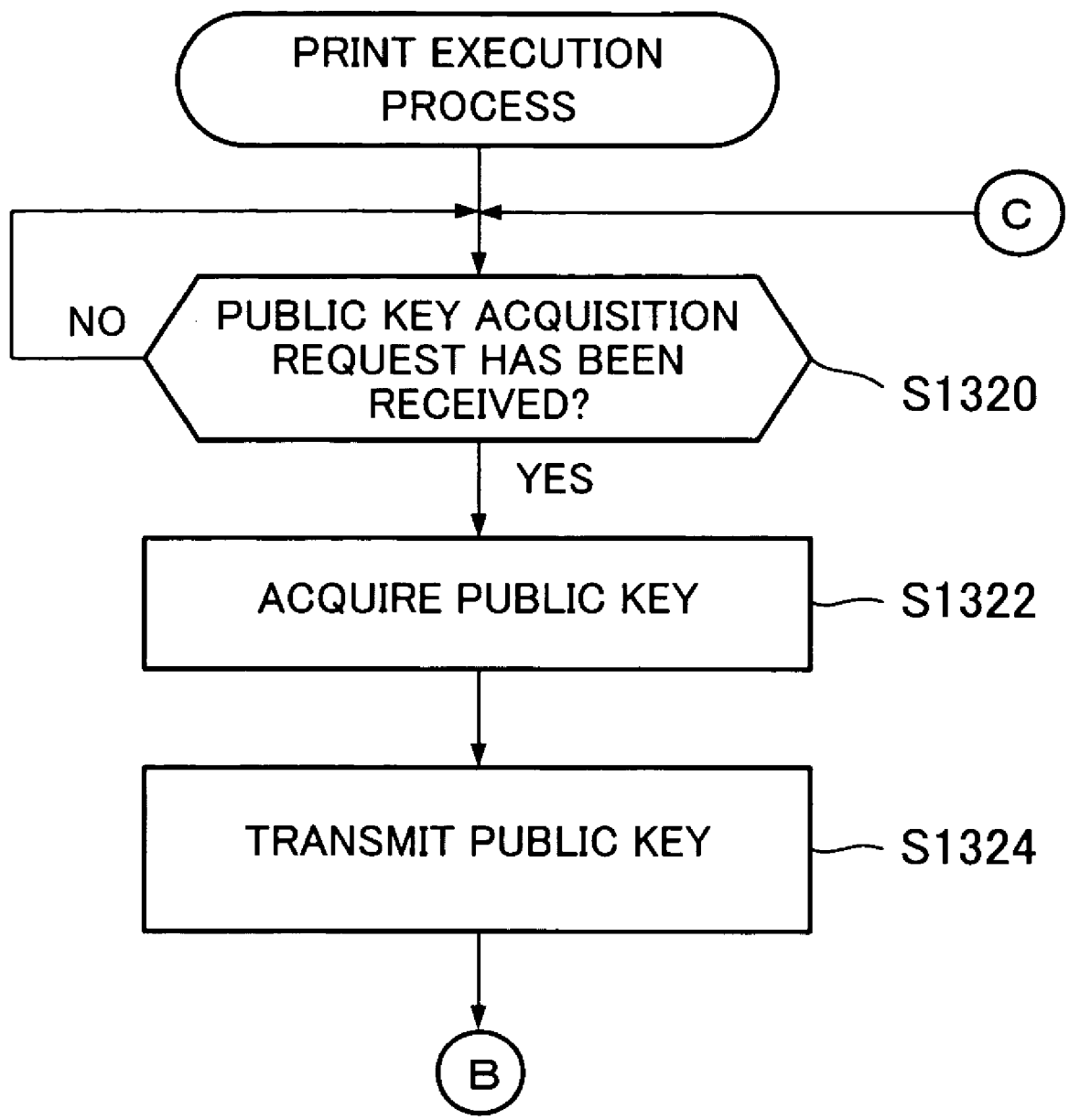
FIG. 30 is a flowchart explaining a print execution process in the fourth embodiment.

Next, a print execution process executed in the printer 30 corresponding to a print request process in the print client 20 will be explained based on FIG. 30. FIG. 30 is a flowchart explaining the print execution process executed in the printer 30. This print execution process is realized by making the CPU 40 read and execute a print execution program stored in the ROM 44 of the printer 30. In this embodiment, this print execution process is regularly executed.

As shown in FIG. 30, the printer 30 judges whether a public key acquisition request has been received from the network 10 (step S1320). When the public key acquisition request has not been received (step S1320: No), the printer 30 stands by while repeating the process in step S1320.

On the other hand, when the public key acquisition request has been received (step S1320: Yes), the printer 30 reads and acquires the public key from the RAM 42 (step S1322). Subsequently, the printer 30 transmits the acquired public key to the print client 20 (step S1324). Then, the printer 30 executes the same process as in FIG. 26 in the aforementioned third embodiment.

Incidentally, processes other than the aforementioned processes executed by the print system according to this embodiment are the same as in the first embodiment, so that a detailed explanation thereof will be omitted.

As described above, according to the print system of this embodiment, when the printer 30 is powered on, the printer position information is acquired to generate the public key, and this public key is held in the RAM 42, whereby the public key can be read from the RAM 42 when it is needed. Accordingly, it becomes unnecessary to acquire printer position information from the position detector 54 each time.

Moreover, the public key is stored in the RAM 42 in which contents are erased when the printer 30 is powered off, so that when the printer 30 is powered on after the printer has been moved, the printer 30 cannot execute a proper print operation any longer. Hence, the place where the printer 30 can be used can be restricted to the place where the public key was generated.

It should be mentioned that the present invention is not limited to the aforementioned first embodiment to fourth embodiment, and various changes may be made therein. For example, in the aforementioned embodiments, the device-specific information in addition to the printer position information is used for the passphrase, but the device-specific information is not necessarily required.

Moreover, in the aforementioned embodiments, the encrypted common key and the encrypted print data are separately transmitted from the print client 20 to the printer 30, but they may be integrated into one file and transmitted from the print client 20 to the printer 30. In this case, the printer 30 acquires the encrypted common key and the encrypted print data respectively from this file.

Furthermore, the aforementioned embodiments are explained with the case where a print medium for the printer 30 is a print sheet as an example, but the print medium is not limited to this, and the present invention can be applied to other print media such as an OHP sheet and the like.

Besides, as for each process explained in the aforementioned embodiments, it is possible to record a program to execute each process on a record medium such as a flexible disk, a CD-ROM (Compact Disc-Read Only Memory), a ROM, a memory card, or the like and distribute this program in the form of the record medium. In this case, the aforementioned embodiments can be realized by making the print client 20 and/or the printer 30 read the record medium on which this program is recorded and execute this program.

Additionally, the print client 20 and/or the printer 30 sometimes has other programs such as an operating system, other application programs, and the like. In this case, by using these other programs in the print client 20 and/or the printer 30, a command, which calls a program to realize a process equal to that in the aforementioned embodiments out of programs in the print client 20 and/or the printer 30, may be recorded on the record medium.

Moreover, such a program can be distributed not in the form of the record medium but in the form of a carrier wave via a network. The program transmitted in the form of the carrier wave over the network is incorporated in the print client 20 and/or the printer 30, and the aforementioned embodiments can be realized by executing this program.

Further, when being recorded on the record medium or transmitted as the carrier wave over the network, the program is sometimes encrypted or compressed. In this case, the print client 20 and/or the printer 30 which has read the program from the record medium or the carrier wave needs to execute the program after decrypting or expanding it.

The invention claimed is:

1. A printer which executes a print operation based on print data, comprising:
    a first printer position information acquisition unit which acquires printer position information to specify a place where the printer is installed, this printer position information being regarded as first printer position information;
    a public key generator which generates a public key with a passphrase containing at least the first printer position information;
    a public key transmitter which transmits the public key to a print client in response to a request from the print client;
    an encrypted common key receiver which receives an encrypted common key generated by encrypting a common key with the public key from the print client;
    an encrypted print data receiver which receives encrypted print data generated by encrypting print data with the common key from the print client;
    a second printer position information acquisition unit which acquires printer position information to specify a place where the printer is installed, this printer position information being regarded as second printer position information;
    a private key generator which generates a private key with a passphrase containing at least the second printer position information;
    a common key acquisition unit which decrypts the encrypted common key received by the encrypted common key receiver with the private key to acquire the common key;
    a print data acquisition unit which decrypts the encrypted print data with the common key acquired by the common key acquisition to acquire the print data; and
    a public key holder which holds the public key generated by the public key generator, wherein the public key transmitter acquires the public key held by the public key holder and transmits this public key to the print client.

2. A printer which executes a print operation based on print data, comprising:
- a first printer position information acquisition unit which acquires printer position information to specify a place where the printer is installed, this printer position information being regarded as first printer position information;
- a public key generator which generates a public key with a passphrase containing at least the first printer position information;
- a public key transmitter which transmits the public key to a print client in response to a request from the print client;
- an encrypted common key receiver which receives an encrypted common key generated by encrypting a common key with the public key from the print client;
- an encrypted print data receiver which receives encrypted print data generated by encrypting print data with the common key from the print client;
- a second printer position information acquisition unit which acquires printer position information to specify a place where the printer is installed, this printer position information being regarded as second printer position information;
- a private key generator which generates a private key with a passphrase containing at least the second printer position information;
- a common key acquisition unit which decrypts the encrypted common key received by the encrypted common key receiver with the private key to acquire the common key;
- a print data acquisition unit which decrypts the encrypted print data with the common key acquired by the common key acquisition to acquire the print data; and
- a public key holder which holds the public key generated by the public key generator, wherein
- the public key transmitter acquires the public key held by the public key holder and transmits this public key to the print client, and
- after the encrypted common key has been received by the encrypted common key receiver and/or the encrypted print data has been received by the encrypted print data receiver, the second printer position information acquisition acquires the second printer position information.

3. The printer according to claim 2, wherein even if a private key is generated when the public key is generated by the public key generator, this private key is abandoned without being saved.

4. The printer according to claim 3, wherein even if a public key is generated when the private key is generated by the private key generator, this public key is abandoned without being saved.

5. The printer according to claim 1, wherein
the public key generator generates the public key with a passphrase containing device-specific information which is information inherent in the printer in addition to the first printer position information, and
the private key generator also generates the private key with a passphrase containing the device-specific information in addition to the second printer position information.

6. The printer according to claim 1, wherein
the encrypted common key and the encrypted print data are transmitted together as one file from the print client, and the encrypted common key receiver and the encrypted print data receiver receive the encrypted common key and the encrypted print data by receiving the file.

7. The printer according to claim 1, wherein
the second printer position information acquisition acquires the second printer position information when the printer is powered on,
the private key generator generates the private key with the passphrase containing at least the second printer position information and stores the private key in a volatile memory device in which memory contents are erased when the printer is powered off, and
the common key acquisition acquires the private key from the volatile memory device and decrypts the encrypted common key received by the encrypted common key receiver to acquire the common key.

8. A printer which executes a print operation based on print data, comprising:
- a first printer position information acquisition unit which acquires printer position information to specify a place where the printer is installed, this printer position information being regarded as first printer position information;
- a public key generator which generates a public key with a passphrase containing at least the first printer position information;
- a public key transmitter which transmits the public key to a print client in response to a request from the print client;
- an encrypted common key receiver which receives an encrypted common key generated by encrypting a common key with the public key from the print client;
- an encrypted print data receiver which receives encrypted print data generated by encrypting print data with the common key from the print client;
- a second printer position information acquisition unit which acquires printer position information to specify a place where the printer is installed, this printer position information being regarded as second printer position information;
- a private key generator which generates a private key with a passphrase containing at least the second printer position information;
- a common key acquisition unit which decrypts the encrypted common key received by the encrypted common key receiver with the private key to acquire the common key; and
- a print data acquisition unit which decrypts the encrypted print data with the common key acquired by the common key acquisition to acquire the print data, wherein
- the public key generated by the public key generator is transmitted to a management server which manages the public key, and
- the print client acquires the public key from the management server.

9. A printer which executes a print operation based on print data, comprising:
- a first printer position information acquisition unit which acquires printer position information to specify a place where the printer is installed, this printer position information being regarded as first printer position information;
- a public key generator which generates a public key with a passphrase containing at least the first printer position information;
- a public key transmitter which transmits the public key to a print client in response to a request from the print client;

an encrypted common key receiver which receives an encrypted common key generated by encrypting a common key with the public key from the print client;

an encrypted print data receiver which receives encrypted print data generated by encrypting print data with the common key from the print client;

a second printer position information acquisition unit which acquires printer position information to specify a place where the printer is installed, this printer position information being regarded as second printer position information;

a private key generator which generates a private key with a passphrase containing at least the second printer position information;

a common key acquisition unit which decrypts the encrypted common key received by the encrypted common key receiver with the private key to acquire the common key;

a print data acquisition unit which decrypts the encrypted print data with the common key acquired by the common key acquisition to acquire the print data; and a private key holder which holds the private key generated by the private key generator, wherein the common key acquisition acquires the private key held by the private key holder and decrypts the encrypted common key received by the encrypted common key receiver with this private key to acquire the common key.

10. The printer according to claim 9, wherein even if a public key is generated when the private key is generated by the private key generator, this public key is abandoned without being saved.

11. The printer according to claim 10, wherein even if a private key is generated when the public key is generated by the public key generator, this private key is abandoned without being saved.

12. The printer according to claim 11, wherein after the public key has been transmitted to the print client by the public key transmitter, the public key is abandoned.

13. The printer according to claim 9, wherein the private key generator generates the private key with a passphrase containing device-specific information which is information inherent in the printer in addition to the first printer position information, and the public key generator also generates the public key with a passphrase containing the device-specific information in addition to the second printer position information.

14. The printer according to claim 9, wherein the encrypted common key and the encrypted print data are transmitted together as one file from the print client, and the encrypted common key receiver and the encrypted print data receiver receive the encrypted common key and the encrypted print data by receiving the file.

15. The printer according to claim 9, wherein the first printer position information acquisition acquires the first printer position information when the printer is powered on, the public key generator generates the public key with the passphrase containing at least the first printer position information and stores the public key in a volatile memory device in which memory contents are erased when the printer is powered off, and the public key transmitter reads the public key from the volatile memory device and transmits the public key to the print client.

* * * * *